(12) United States Patent
Suzuki et al.

(10) Patent No.: US 6,532,911 B2
(45) Date of Patent: Mar. 18, 2003

(54) INTERNAL COMBUSTION ENGINE HAVING HEAT ACCUMULATOR, CONTROL OF HEAT SUPPLY SYSTEM AND CONTROL METHOD OF INTERNAL COMBUSTION ENGINE

(75) Inventors: Makoto Suzuki, Mishima (JP); Katuhiko Arisawa, Susono (JP); Masakazu Tabata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/907,596

(22) Filed: Jul. 19, 2001

(65) Prior Publication Data

US 2002/0011221 A1 Jan. 31, 2002

(30) Foreign Application Priority Data

Jul. 26, 2000 (JP) .................. 2000-225826
Aug. 14, 2000 (JP) .................. 2000-245930

(51) Int. Cl.$^7$ ................................ F01P 11/02
(52) U.S. Cl. .................................. 123/41.14
(58) Field of Search ............... 123/41.14, 142.5 R

(56) References Cited

U.S. PATENT DOCUMENTS 5,291,960 A * 3/1994 Bradenburg et al. ....... 180/65.2
5,662,072 A * 9/1997 Suzuki et al. ............ 123/41.14
5,765,511 A * 6/1998 Schatz .................... 123/41.14
5,894,834 A * 4/1999 Kim ...................... 123/41.29
2002/0011236 A1 * 1/2002 Suzuki et al. ............ 123/142.5

FOREIGN PATENT DOCUMENTS

JP          A 6-185359       7/1994

* cited by examiner

Primary Examiner—Thomas N. Moulis
(74) Attorney, Agent, or Firm—Oliff & Berridge, PLC

(57) ABSTRACT

According to an internal combustion engine of the invention, release operation of an antitheft device is selected as an event generating by necessity prior to the starting of an engine, and the pre-heat is started based on the generating timing of the selected event. The start timing of the release operation of the antitheft device is high in terms of both necessity as an event generating prior to the starting of the engine and reproducibility of the time length from its start timing to an arbitrary starting timing of the engine. The pre-heat completed state can be secured by starting the pre-heat synchronously with this timing or at a predetermined timing based on the timing, even when the engine is started at an arbitrary timing. Exhaust characteristics and fuel consumption performance can be improved by optimizing the temperature distribution of the engine at starting.

24 Claims, 19 Drawing Sheets

F I G. 5A
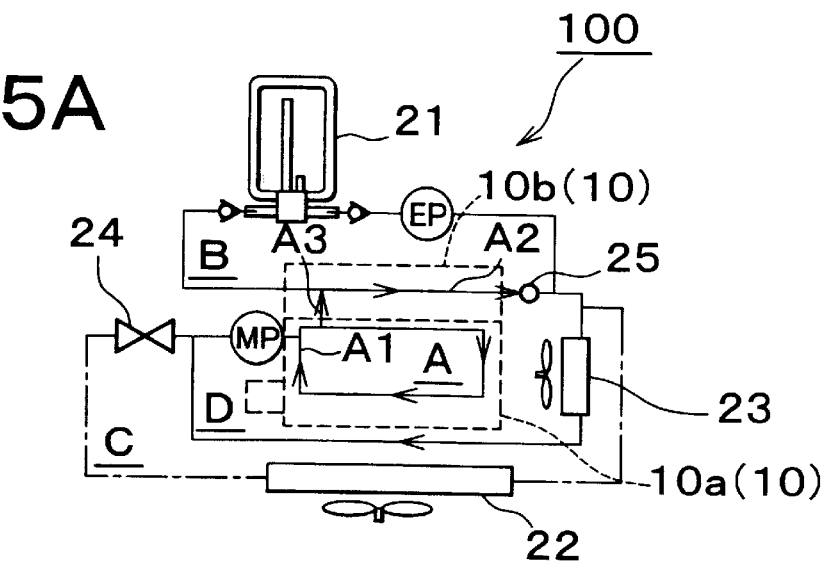
F I G. 5B
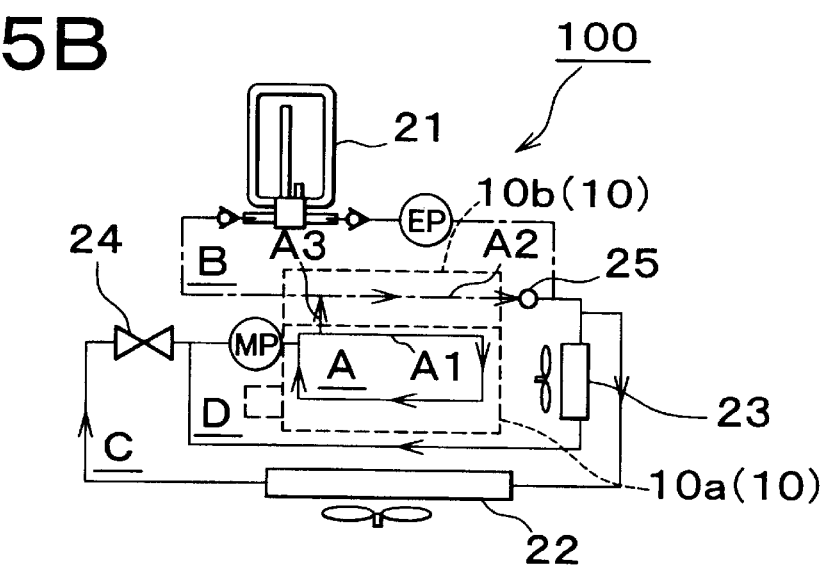
F I G. 5C
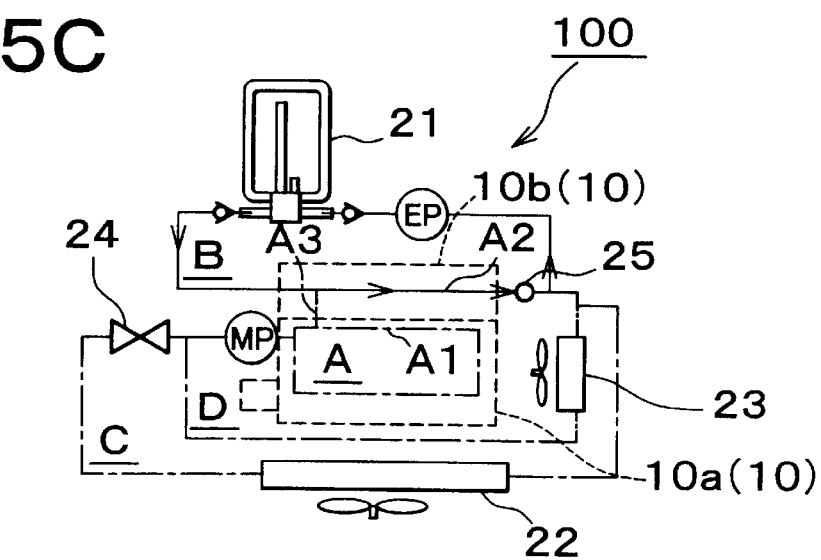

INTERNAL COMBUSTION ENGINE HAVING HEAT ACCUMULATOR, CONTROL OF HEAT SUPPLY SYSTEM AND CONTROL METHOD OF INTERNAL COMBUSTION ENGINE

INCORPORATION BY REFERENCE

The disclosure of Japanese Patent Application No. 2000-225826 filed on Jul. 26, 2000 and No. 2000-245930 filed on Aug. 14, 2000 including the specification, drawings and abstract are incorporated herein by reference in their entirety.

BACKGROUND OF THE INVENTION

1. Field of the Invention

The invention relates to an internal combustion engine installed in a vehicle, which has a heat accumulator for accumulating heat temporarily, and sending it to a circulation passage where a heat medium flows, and more particularly, a control apparatus and control method for controlling the heat supply from the heat accumulator to the circulation passage.

2. Description of the Related Art

In general, for an internal combustion engine installed in a vehicle such as automobile, it is undesirable to run the engine in the state where the temperature around a combustion chamber has not attained a predetermined temperature (cold state) because this causes problems such as the fuel which is supplied to the combustion chamber not being sufficiently atomized, deteriorating the exhaust characteristics (emissions) and the fuel consumption performance.

However, in practice, excluding the case of restarting after a temporary engine stop, engines must run in a cold state from the moment of engine start until it is finished warming up each time when the engine first started.

In order to solve these problems, a heat accumulator having a function to accumulate heat generated by the internal combustion engine during running in a predetermined accumulation container, and release this accumulated heat to the engine in a cold state is known.

For example, the heat accumulator for an internal combustion engine described in the Japan Patent Application Laid-Open No. 6-185359 stores some of cooling water heated by the radiation from the engine keeping it hot even after the engine is stopped, and heats the engine early by releasing the stored heated cooling water to the cooling system (cooling passage of the engine) during the next engine start.

However, it was likely that, normally, warm up is not completed to a preferable temperature at the instant of engine start even when hot water circulates through the cooling passage of the engine at the time of engine start, and the engine can not be started in a sufficiently warm state. That is, in some cases, it was impossible to control the working state of the engine conveniently, in relation to the heat supply timing to the engine or, the state after heat supply to the engine.

Not limited to the internal combustion engine provided with a heat accumulator, the same problem occurs also in the other heat receiving objects requiring a certain level of warm up, in other words, heat supply, for securing a preferable working state.

SUMMARY OF THE INVENTION

In view of the foregoing situations, the object of the invention is to provide a control apparatus of a heat receiving object for performing optimal heat supply from a heat accumulator to the heat receiving object, based on the working state of the heat receiving object. Another object of the invention is to provide an internal combustion engine with a heat accumulator preferably functioning as such a heat receiving object.

In order to achieve the aforementioned object, an internal combustion engine according to a first aspect of the invention comprises a circulation passage for circulating a heat medium, a heat accumulator for accumulating heat, and a heat supply device for supplying the circulation passage with heat accumulated by the heat accumulator through the heat medium, and starts to supply the circulation passage with heat by the heat supply device at a timing set based on specific timing elements related to engine start, and prior to starting of the engine.

Here, timing elements mean parameters in general concerning a period or time, and for example, start timing, end timing or period of a specific operation, or start timing, end timing or a period of the occurrence of a specific event or the like corresponding thereto.

It is most desirable that the engine starts when a predetermined period has elapsed after the start of heat supply to the internal combustion engine by the heat accumulator, for the optimization of the discharge characteristics and fuel consumption in the initial phase of engine running. And, it is preferable to match this engine start timing with a timing when a necessary and sufficient amount of heat supply to the engine is completed (completion timing of heat supply).

It is possible to match the engine start timing with the completion timing of heat supply by starting the engine after the completion of heat supply taking the aforementioned start timing of heat supply as reference. However, in a case where it is desired to start the engine at an arbitrary timing, it is difficult to decide the aforementioned timing of heat supply retroacting from the timing of engine start.

According to the same constitution, it becomes possible to set a start timing of heat supply retroacting by a proper period from the timing of engine start, even when the engine is started at an arbitrary timing by starting to supply heat taking as reference a specific event occurring necessarily prior to engine start.

As for the timing elements, for example, the following timings can be adopted:
(1) Timing when working release of antitheft device is started.
(2) Timing when the door for getting in and out of a vehicle installed with the engine is opened.
(3) Timing when sitting in the driver's seat is detected.
(4) Timing when fastening of the seat belt provided with the driver's seat of the vehicle is detected.
(5) Timing when vehicle break operation is detected.
(6) Timing when clutch operation of the vehicle in which the engine is installed is detected.
(7) Timing when release of a door lock for getting in and out of the vehicle is detected.

By adopting the timings of (1) to (7) as the aforementioned timing elements, these operations are sufficiently high in both necessity prior to the starting of internal combustion engine, and reproducibility of operation timing. Consequently, it is possible to reliably set an appropriate start timing of heat supply each time when the engine is started by deciding the start timing of heat supply based on these operation timings.

In addition, according to a control apparatus of heat supply according to a second aspect of the invention, heat supply to the heat receiving object is performed based on the establishment of predetermined conditions. These conditions are determined based on a specific state related to the starting of the heat receiving object and, at the same time, the supply period of heat to the same heat receiving object is controlled based on the specific state related to the starting of the heat receiving object.

Here, the aforementioned heat receiving object means anything performing any action, and to which heat is supplied. In such a heat receiving object, the state of itself is affected by the degree of heat supply. According to the aforementioned constitution, it becomes possible to set a start timing of heat supply retroacting by a proper period from the starting timing of the heat receiving object, even when the heat receiving object is started at an arbitrary timing, by starting to supply heat taking as a reference, for example a specific event occurring necessarily related to the starting of the heat receiving object.

Here, the heat receiving object may be a motor.

When the heat receiving object is a motor, the working state during the starting can be controlled appropriately for a motor whose working state during its start is variable according to the heat coming in and going out.

An internal combustion engine according to a third aspect of the invention comprises a circulation system for circulating a heat medium, and a heat supply device for supplying the engine with heat accumulated by the heat accumulator through the heat medium circulating in the circulation system, and makes the heat supply device supply a plurality of times the engine with heat, prior to engine start.

Here, in addition to fluid such as gas or liquid, the heat medium includes also media including heat (energy) latently but having practically no substance such as light or electric current. The circulation system for circulating such medium may be a circulation passage for fluid such as, for example, a cooling passage of an internal combustion engine, or an electric passage for electric current. Also, it may be a space for propagating radiation heat.

A plurality of times of heat supply means an aspect wherein increase and decrease (variation) of calorific value supplied by a unit time are repeated discontinuously or continuously. That is, it means both an aspect wherein relatively high calorific value and relatively low calorific value are supplied alternately, and an aspect wherein the heat supply is once suspended after a predetermined amount of heat is supplied, and then the predetermined amount of heat is supplied again.

According to the aforementioned third aspect, the heat supply is performed based on the continuous operation mode of the heat supply device. Consequently, a finite amount of heat stored in the heat accumulator can be used for a longer period than a case where calorific value stored by the heat accumulator is discharged (consumed) continuously. That is, consumption of calorific value stored in the heat accumulator prior to the starting of the engine can be prevented, or the temperature of the engine once elevated can be prevented substantially from dropping again, even when the starting timing is unstable, for example, when the starting timing of the engine is delayed for some reason.

Consequently, heat supply is reliably completed at the time of starting the engine, even when the engine is started at an arbitrary timing.

Here, at least one of the plurality of times of heat supply by the heat supply device may be performed during the starting of the engine. In this case, the heat supply is sustained during the starting initial phase of the engine, allowing to enhance further the discharge characteristics and fuel consumption concerning the starting of the engine.

Moreover, a control apparatus of heat supply system according to a fourth aspect of the invention makes the heat supply system supply the heat receiving object with heat a plurality of times, prior to when the heat receiving object starts operating.

According to the same constitution, for example, the heat supply to a heat receiving object is performed based on a discontinuous operation mode of the heat supply system. Consequently, compared to a case where the calorific value store by the heat supply system is continuously discharged (consumed), heat stored in the heat supply system can be used for a long period of time, even if it is limited.

Therefore, in the case of starting the heat receiving object at an arbitrary timing, the heat supply is completed reliably at the moment of start thereof.

Consequently, regarding the heat supply necessary for the starting of the heat receiving object, desired heat supply timing and heat supply amount required for ensuring an optimal working state are applied reliably.

Also, at least one of the plurality of times of heat supply by the heat supply system may be performed during the operation start of the heat receiving object. In this constitution, heat supply is sustained during the starting initial phase of the heat receiving object, allowing the working state necessary for the starting of the heat receiving object to be ensured more suitably.

Here, the heat receiving object may be a motor, and the working state during the starting can be controlled appropriately for a motor whose working state during its start is variable according to the heat coming in and going out.

Also, the motor may be an internal combustion engine, and the combustion state during the starting can be controlled appropriately for an internal combustion engine whose working state during its start is variable, according to the heat coming in and going out, combustion state depends especially on its working state, and wherein the heat supply to be performed in order to stabilize especially its combustion state is preferably completed prior to starting.

The aspects of the invention are not limited to the aforementioned internal combustion engine for a vehicle and a control apparatus of a heat receiving object. Another aspect of the invention is a control method of, for example, internal combustion engine or heat receiving object.

BRIEF DESCRIPTION OF THE DRAWINGS

FIGS. 5A to 5C are schematic diagrams showing the outline of the engine system according to the same embodiment;

DESCRIPTION OF THE PREFERRED EMBODIMENTS

Now, one embodiment wherein an internal combustion engine installed in a vehicle having a heat accumulator according to the invention is applied to an engine system for a vehicle will be described referring to drawings.

Figure 1:
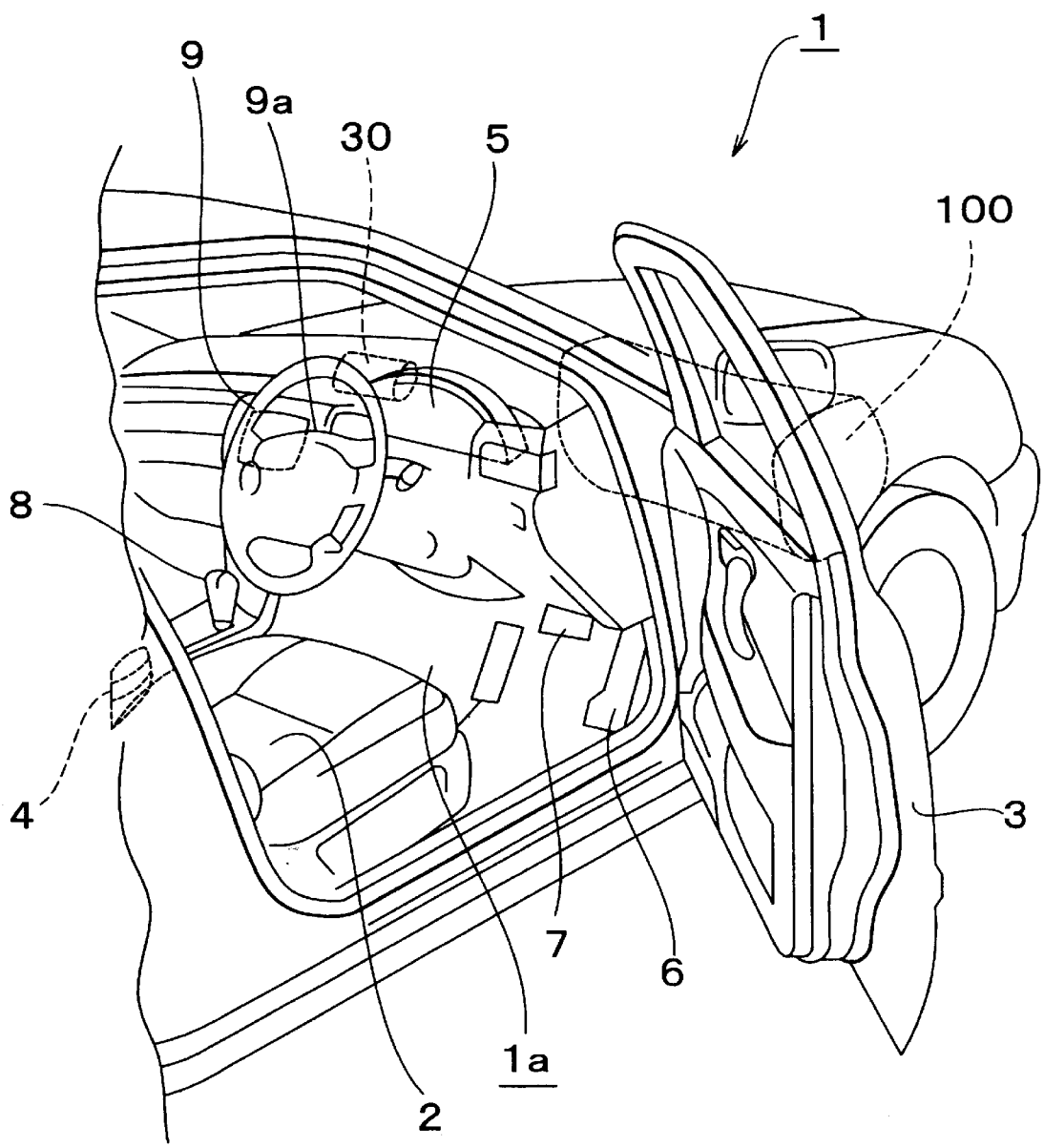
FIG. 1 is a schematic view showing a part of a vehicle installed with an engine system for a vehicle according one embodiment of the invention.

FIG. 1 is a schematic view showing a part of a vehicle wherein an engine system for vehicle (internal combustion engine) according one embodiment of the invention is installed.

A vehicle 1 in which is installed an engine system for a vehicle (called engine system, hereinafter) 100 as a transmission system is a vehicle of so-called automatic transmission system not requiring clutch operation for its driving. As shown in FIG. 1, a driver's seat 1a occupying a part of a compartment of the vehicle 1 comprises a door for getting in and out (driver's seat side door) 3, an inner buckle 4 for fastening/unfastening a seat belt (not shown), a key cylinder 5 for starting and the like an engine body (not shown) provided in the engine system 100, an accelerator pedal 6 for adjusting the engine power of the same engine body, a brake pedal 7 for braking the vehicle 1, a shift lever 8 for switching over the function of a transmission (not shown), a display device 9 for displaying image information such as traffic information or the like on a screen, as well as allowing an input operation by touch operation, and a microphone 9a for detecting the voice of the driver, and the like, disposed around and on the periphery of a driving seat 2. The aforementioned various members 2 to 9 and 9a disposed around the driver's seat la are connected electrically to an electronic control unit (ECU) 30 respectively and directly, or through devices (sensors) for detecting the operation of the concerned members.

Figure 2:
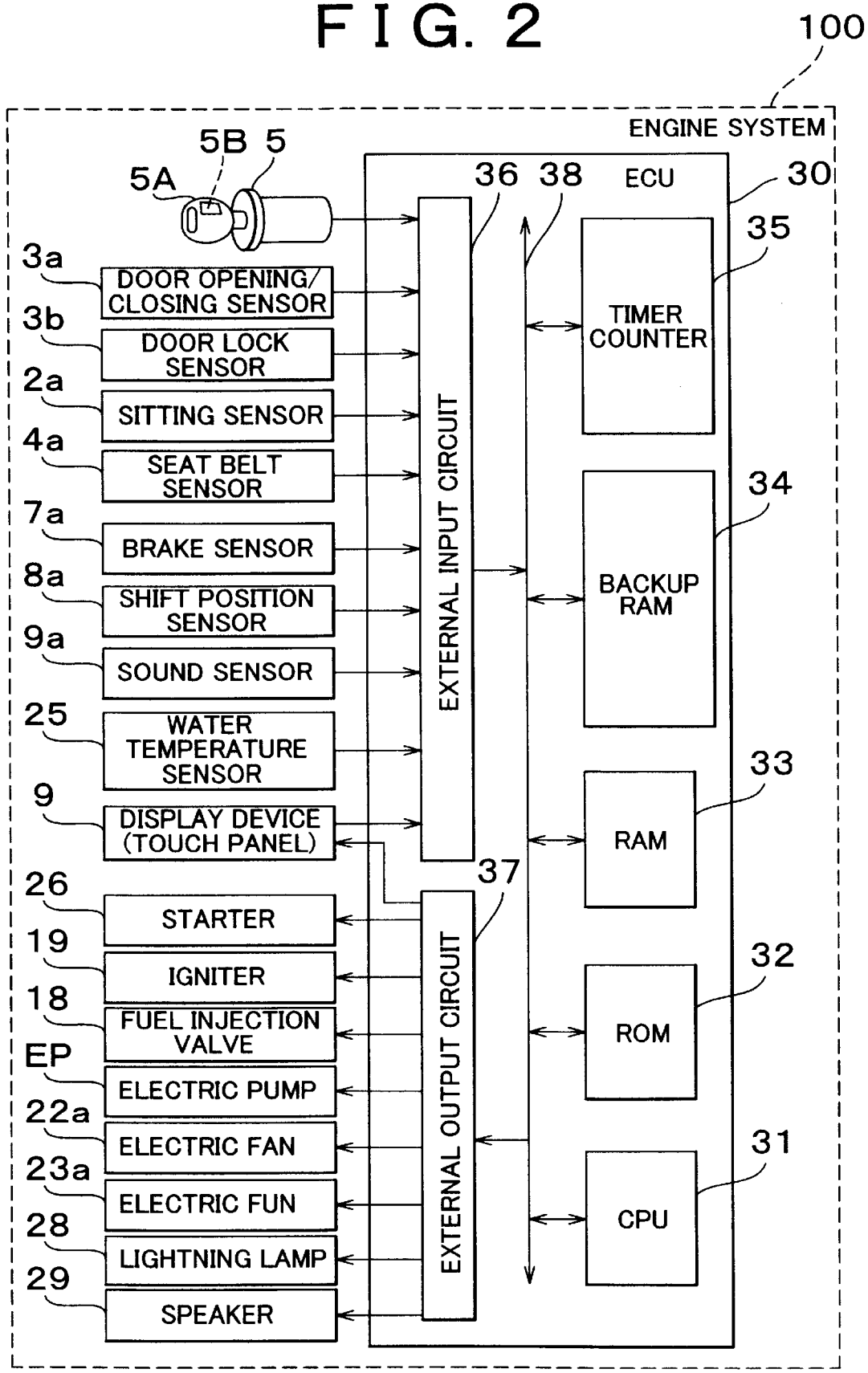
FIG. 2 is block diagram schematically showing the electrical configuration of the engine system around an electronic control unit according to the same embodiment.

FIG. 2 shows the outlines of the electric constitution of the engine system around the ECU 30. As shown in FIG. 2, various devices for outputting information concerning respective components of the vehicle 1 or the driver as an electric signal, including a key cylinder 5, a sitting sensor 2a, a door opening/closing sensor 3a, a door lock sensor 3b, a seat belt sensor 4a, a brake sensor 7a, a shift position sensor 8a, a microphone (sound sensor) 9a and a water temperature sensor 25 and the like, are electrically connected to an external input circuit 36 of the ECU 30.

The key cylinder 5 has a function as a so-called ignition switch for switching the operation mode of respective members related to the starting of the engine 10, according to the operation of an ignition key 5A inserted in the same key cylinder 5. That is, it turns ON and OFF a main power source of peripheral devices including, first of all, the display device 9 (refer to FIG. 1), a room lamp (not shown), an audio system (not shown), or indicator lamps, and a main relay for operating a function to execute the running control of the engine 10 for the ECU 30 and further, outputs command signals to a starter 26, an igniter 19, a fuel injection valve 18 and the like related to the starting of the engine 10 through the ECU 30.

In addition, the key cylinder 5 constituted a well-known antitheft device together with the ignition key 5A. Namely, the ignition key 5 has a built-in communication chip 5B where a specific code is recorded. Upon insertion of the ignition key 5A into the key cylinder 5, the key cylinder 5 reads the specific code recorded in the communication chip 5B and transfers the code to the ECU 30. The ECU 30 collates a registered code stored previously in itself with the aforementioned specific code transferred from the key cylinder 5 and permits the engine 10 to start only when both agree with each other. In other words, the engine 10 can not be started without the ignition key 5A having a built-in communication chip where a regular code is recorded. Here, the collation of the aforementioned specific code with the registered code by the ECU 30 is called "release operation of the antitheft device".

The door opening/closing sensor 3a and the door lock sensor 3b are attached to the driver's seat side door 3 (refer to FIG. 1). The door opening/closing sensor 3a identifies the open/close state of the driver's seat side door 3, and outputs a signal according to this identification. The door lock sensor 3b identifies whether the driver's seat side door 3 is locked or not, and outputs a signal according to this identification. The sitting sensor 2 built in the driving seat 2 (refer to FIG. 1) identifies whether the driver is seated or not, and outputs a signal according to this identification. The seat belt sensor 4a attached to the inner buckle 4 identifies the fastened/unfastened state of a seat belt (not shown) to/from the inner buckle 4, and outputs a signal according to this identification. The brake sensor 7a attached to the brake pedal 7 outputs a signal according to the pressure to the brake pedal 7. The shift position sensor 8a attached to the shift lever 8 outputs a signal according to the position (shift position) of the shift lever 8 selected by the driver.

On the other hand, to the external output circuit 37 of the ECU 30, in addition to members for controlling the running state of the vehicle 1 (engine system 100) such as the fuel injection valve 18, the igniter 19, an electric powered water pump (electric pump) EP, electric powered ventilation fans (electric fans) 22a and 23a, the starter 26 and the like, a lighting lamp 28 and a speaker 29 and the like to be mounted in the compartment (for example, near the display device 9) of the vehicle 1 are connected electrically.

As mentioned above, the display device 9 for displaying (outputting) image information such as traffic information and the like on the screen and, in addition, allowing an input operation by touch operation is connected electrically to both the external input circuit 36 and the external output circuit 37.

The ECU 30 comprises on the inside thereof a central processing unit (CPU) 31, read only memory (ROM) 32, random access memory (RAM) 33, backup RAM 34 and a timer counter 35 and the like, and constituted a logical operation circuit by connecting these respective sections with the external input circuit 36 and the external output circuit 37 through a bus 38. Here, the ROM 32 previously stores various programs for controlling the running state or the like of the engine 10 of the engine system 100, including the fuel injection amount, ignition timing, and behavior of the cooling water in the cooling system 20, and the like. The RAM 83 temporarily stores the results or the like of operations by the CPU 52. The backup RAM 34 is a nonvolatile memory for storing data even after the engine 10 has stopped running. The timer counter 35 performs the clock operation. The external input circuit 36 comprises a buffer, a waveform circuit, a hard filter, and an A/D converter and the like. The external output circuit comprises a driving circuit and the like.

Thus composed ECU 30 executes various controls of the engine system 100 concerning starting, fuel injection, ignition or cooling water behavior of the engine 10, based on signals from the aforementioned various sensors 2a, 3a, 3b, 4a, 7a, 8a, and 9a, key cylinder 5, and the display device 9 or the like taken in through the external input circuit 36.

Figure 3:
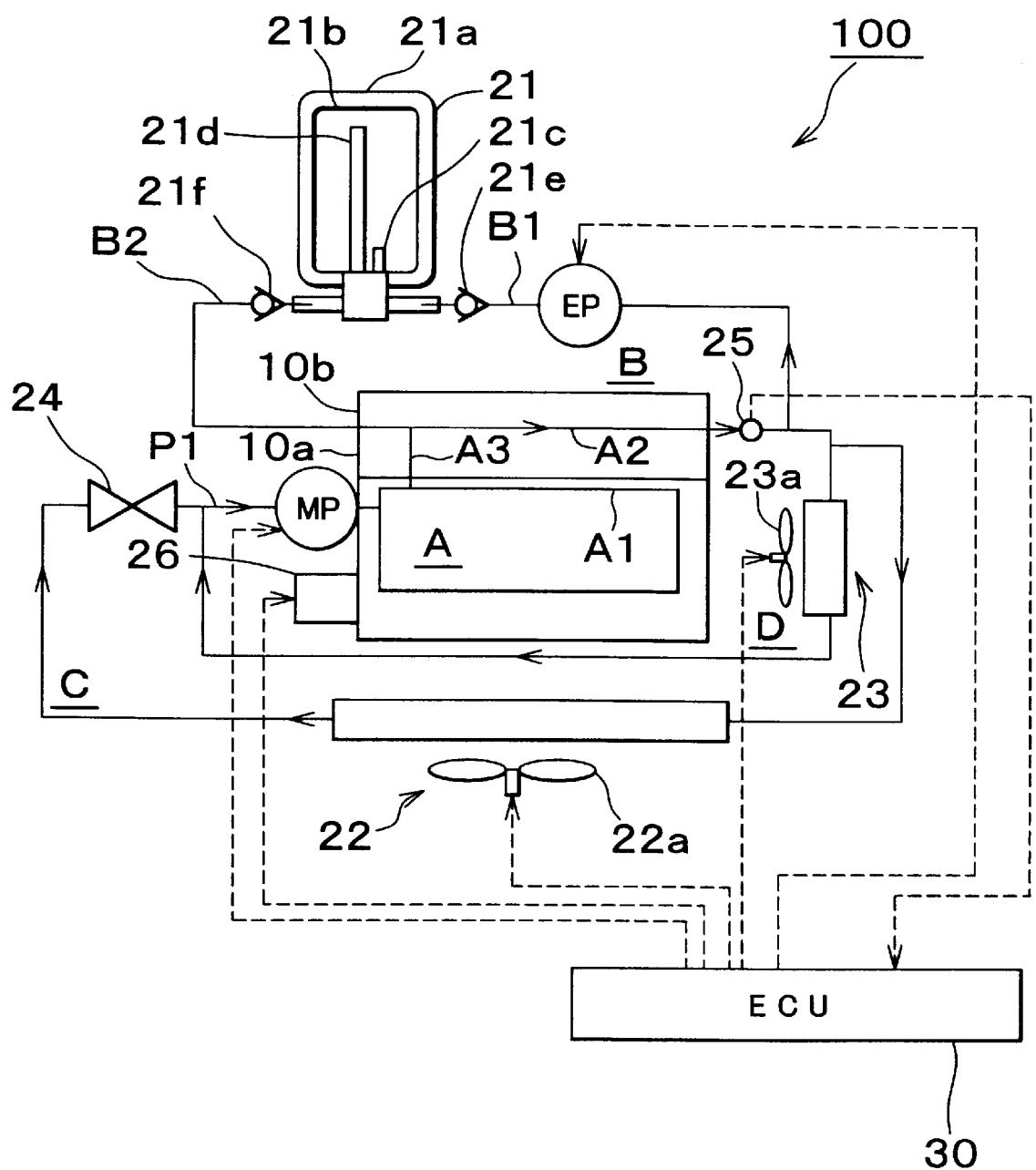
FIG. 3 is a schematic constitution diagram showing the engine system for a vehicle according to the same embodiment.

FIG. 3 shows the schematic constitution of the engine system 100 according to the same embodiment.

As shown in FIG. 3, the engine system 100 comprises mainly an engine body (engine) 10, a cooling system 20 and an electronic control unit (ECU) 30.

The casing of the engine 10 is formed with a cylinder block 10a as the lower level and a cylinder head 10b as the upper level, with both of these members 10a and 10b closed together. Four combustion chambers (not shown) and intake and exhaust ports (not shown) for communicating respective combustion chambers with the outside are formed on the inside of the engine 10. The engine 10 obtains a revolution driving force by explosion and combustion of the mixture (mixed gas of air and fuel) supplied through the intake port.

The cooling system 20 is composed of a circulation passage (water jacket) A formed so as to surround the periphery of respective combustion chambers and intake and exhaust ports in the engine 10, a circulation passage B for circulating cooling water between the engine 10 and the heat accumulation container 21, a circulation passage C for circulating cooling water between the engine 10 and a radiator 22, and a circulation passage D for circulating cooling water between the engine 10 and a heater core 23 for heating. A part of the circulation passage A is used commonly with a part of respective circulation passages B, C, and D. Further, the circulation passage A can roughly be divided into a circulation passage A1 formed in the cylinder block 10a, a passage A2 formed in the cylinder head 10b, and a bypass passage A3 communicating between the circulation passage A1 and the passage A2.

That is, the cooling system 20 is a complex system constructed by combining a plurality of circulation passages for cooling water, and the cooling water circulating in this cooling system 20 cools down or heats respective sections of the engine 10 by exchanging heat with the same engine 10 as a heat medium. Note that the heat accumulation container 21 and the circulation passage B compose the heat supply system according to this embodiment.

The aforementioned respective circulation passages A, B, C and D composing the cooling system 20 are provided with various members for controlling or detecting behavior or temperature of the cooling water.

The electric powered water pump (electric pump) EP operates based on the command signal from the ECU 30, and moves the cooling water in the circulation passage B in the direction of the arrow.

The heat accumulation container 21 is provided downstream the electric pump EP. The heat accumulation container 21 has a function to store a predetermined amount of cooling water in an adiabatic state from the outside. That is, as shown by the outline inner structure of the same FIG. 3, the heat accumulation container 21 has a double structure having a housing 21a and a cooling water receiving section 21b arranged in the same housing 21a. The gap between the housing 21a and the cooling water receiving section 21b is maintained substantially in a vacuum state for maintaining the space inside the cooling water receiving section 21b and the exterior in the adiabatic state. An introduction pipe 21c for introducing cooling water sent from the circulation passage B (pump side passage B1) into the same container 21b, and a discharge pipe 21d for discharging cooling water in the same container 21b to the circulation passage B (engine side passage B2) are disposed in the cooling water receiving section 21b. Cooling water discharged to the engine side passage B2 through the discharge pipe 21d is introduced into the cylinder head 10b of the engine 10, and flows preferentially through the path formed near the intake port of respective cylinders in the same cylinder head 10b.

In addition, check valves 21e and 21f disposed respectively in the middle of passage of the pump side passage B1 and the engine side passage B2 allows only the cooling water from the pump side passage B1 to the engine side passage B2 through the heat accumulation container 21 to flow, and restricts backflow.

A mechanical water pump (mechanical pump) MP takes cooling water in the cylinder block 10a from an external passage P1, during the operation of the engine 10, using driving force transmitted from the output shaft of the engine 10. When the mechanical pump MP operates according to the operation of the engine 10, cooling water in the circulation passage C and in the circulation passage B is urged to flow in the directions of the arrows, respectively.

The radiator 22 disposed in the circulation passage B radiates heat from the heated cooling water to the outside. The electric fan 22a drives based on the command signal from the ECU 30 to enhance the radiation effect of cooling water by the radiator 22. Moreover, a thermostat 24 is provided in the middle of the circulation passage C and downstream the radiator 22. The thermostat 24 is a well-known control valve which opens and closes in response to the temperature level, opening to allow the cooling water to flow if the cooling water temperature in the circulation passage C near the same thermostat 24 exceeds a predetermined temperature (for example 80° C.) and closing to regulate the flow of cooling water when it is below the predetermined temperature.

In other words, if the cooling water temperature exceeds 80° C. when the engine 10 is running (when the mechanical pump MP operates), the cooling water in the circulation passage C is allowed to flow, and the cooling water (engine 10) is forced to cool down by the effect of the radiator 22. For the engine 10, a state where its temperature (substantially equivalent to the cooling water temperature in the cooling system 20) exceeds 80° C. or is approximately near 80° C. shall be the hot state and a state below 80° C. the cold state.

The heat core 23 for heating disposed in the circulation passage D heat a vehicle compartment (not shown) as necessary, using heat of the cooling water heated in the engine 10. The electric fan 23a driven based on the command signal from the ECU 30, facilitates heat radiation of the cooling water passing through the heat core 23 for heating and, at the same time, sends hot air generated by the heat radiation from the cooling water into the vehicle compartment through an air passage (not shown).

For the cooling water circulating through respective circulation passages B, C, and D, the water temperature sensor 25 disposed in the middle of a common passage from the engine 10 to the outside outputs a detection signal corresponding to the cooling water temperature (the cooling water temperature) THW in the same passage to the ECU 30.

Now, the structure around respective combustion chambers formed in the engine 10 will be described in detail, focusing on the passage for cooling water.

Figure 4:
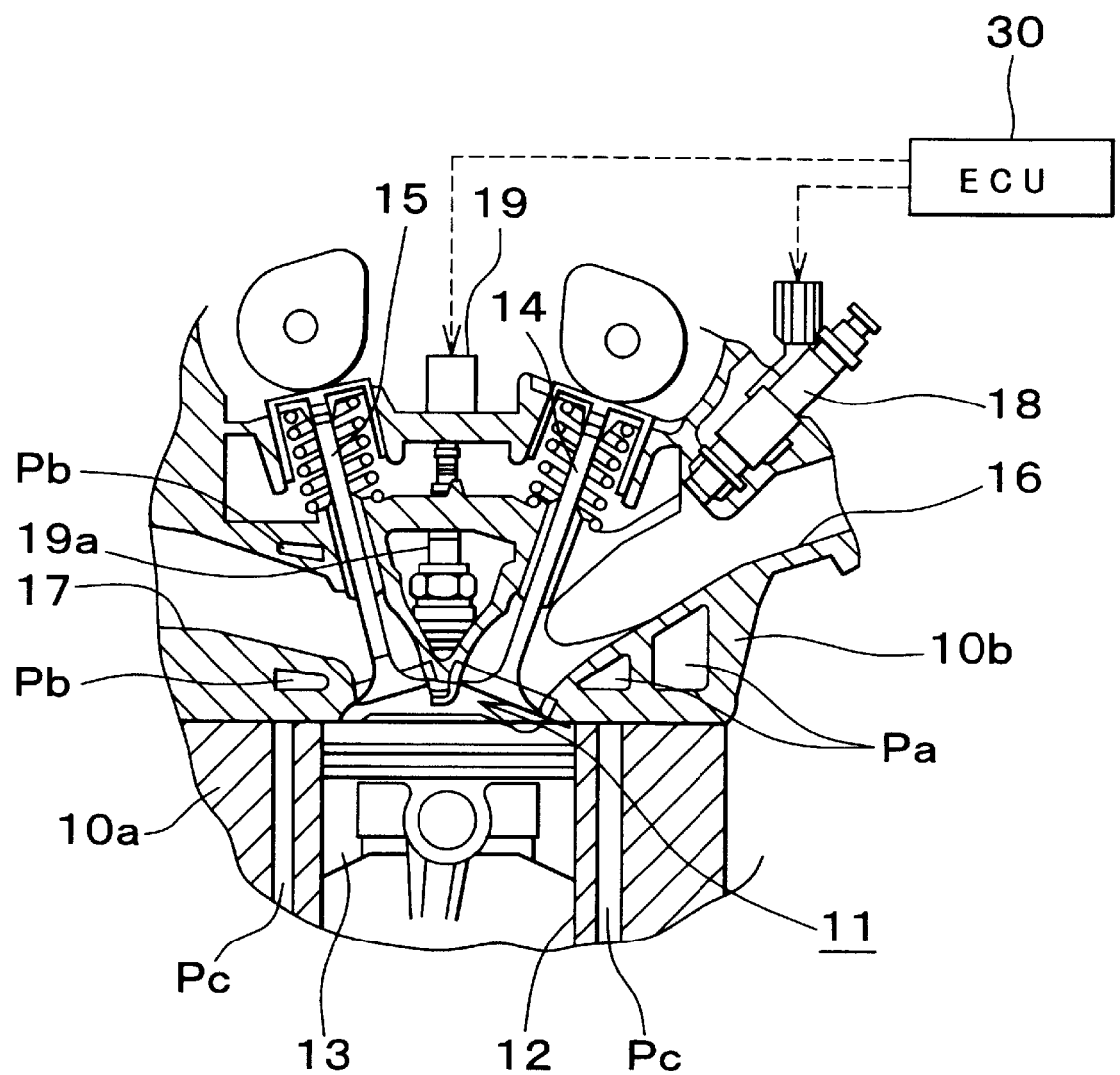
FIG. 4 is a rough sketch showing a partially enlarged view of the cross-sectional structure around a combustion chamber of an engine according to the same embodiment.

FIG. 4 is a rough sketch (side view) showing a partially enlarged view of the cross-sectional structure around the combustion chamber, as a part of the internal structure of the engine 10.

As shown in FIG. 4, the combustion chamber 11 is positioned at the boundary between the cylinder block 10a and the cylinder head 10b, and is formed over a piston 13 moving up and down together with the revolution of the output shaft of the engine 10 in the cylinder 12. The space in the combustion chamber 11 communicates with the intake port 16 and the exhaust port 17 respectively through the intake valve 14 and the exhaust valve 15, allowing the mixture to be introduced through the intake port 16 and the exhaust gas to be discharged through the exhaust port 17 when the engine is running. A fuel inject valve 18 attached to the intake port 16 supplies fuel by injection based on the command signal from the ECU 30. Fuel supplied by injection from the fuel injection valve 18 is atomized in the intake port 16 and taken in the combustion chamber 11 and forms a mixture with fresh air. Then, the mixture taken into the combustion chamber 11 is supplied for combustion when the igniter 19 also driven based on a command signal from the ECU 30 turns on a spark plug 19a at a appropriate timing.

A cooling water passage (corresponding to a part of the circulation passage A1 shown in FIG. 3) Pc is formed in the cylinder block 10a so as to surround the periphery of the cylinder 12. In addition, an intake port side cooling water passage Pa (corresponding to a part of the circulation passage A2 shown in FIG. 3) and an exhaust port side cooling water passage Pb (similarly, corresponding to a part of the circulation passage A2 shown in FIG. 3) are formed near the intake port 16 and the exhaust port 17, respectively, in the cylinder head 10b. The behavior of cooling water circulating in the cooling system 20 including these respective cooling water passages Pa, Pb, and Pc (circulation passages A1, A2) is controlled basically by the operation of the mechanical pump MP, the electric pump EP and the thermostat 24 as mentioned above.

Next, the cooling system control concerning the behavior of cooling water to be executed by the engine system 100 according to this embodiment, through the command signal from the ECU 30 or the like. There, the cooling system control by the engine system 100 is roughly divided into "control of cold time after engine starting", "control of hot time after starting", and "control prior to starting the engine (pre-heat control)" according to the difference in its execution timing and execution conditions.

FIG. 5A, FIG. 5B, and FIG. 5C are schematic diagrams showing the outline of the same engine system 100 for illustrating how the cooling water flow circulating in the cooling system 20 of the engine system 100 (refer to FIG. 3) varies according to the running state and the temperature distribution of the engine 10. In FIG. 5A, FIG. 5B, and FIG. 5C, the passages wherein the flow of cooling water is generated (including various members disposed in the middle of the passage) are indicated by a solid line, while the passages wherein the flow of cooling water is not or barely generated (including various members disposed in the middle of the passage) are indicated by a dashed line.

First, both FIG. 5A, and FIG. 5B show the engine system 100 wherein the engine 10 is running and the electric pump EP is stopped. However, FIG. 5A shows a state wherein the cooling water temperature near the thermostat 24 is 80° C. or below in the cooling system 20, while FIG. 5B indicates a state wherein the cooling water temperature near the thermostat 24 exceeds 80° C. similarly in the cooling system 20.

As shown in FIG. 5A and FIG. 5B, when the electric pump EP is stopped, the cooling water substantially stops flowing along the circulation passage B, except for the circulation passage A, circulation passage C or circulation passage A2 composing a part of the circulation passage D, in the cylinder head 10b.

At this time, if the cooling water temperature near the thermostat 24 is 80° C. or below in the cooling system 20, the same thermostat (control valve) 24 closes, regulating the flow of cooling water from the same control valve 24 to the radiator 22. Consequently, only the cooling water in the circulation passage A and in the circulation passage B flows by the effect of the mechanical pump MP in the engine system 100 (FIG. 5A).

Also, if the cooling water temperature near the thermostat 24 exceeds 80° C. in the cooling system 20, the same thermostat (control valve) 24 opens, allowing the flow of cooling water from the same control valve 24 to the radiator 22. Consequently, cooling water in the circulation passages A, C, and D flows by the function of the mechanical pump MP in the engine system 100 (FIG. 5B).

In this embodiment, the cooling system 20 maintains basically the state shown in FIG. 5A or FIG. 5B while the engine 10 is operating as an engine. In addition, the state of the cooling system 20 shown in the respective drawings is realized by "control of cold time after engine starting" (FIG. 5A) or "control of hot time after starting" (FIG. 5C).

In addition, FIG. 5C shown the engine system 100 wherein the engine 10 is in the stopped state and the electric pump EP is in the operating state.

As shown in FIG. 5C, when the electric pump EP operates, the cooling water flows along the circulation passage B. At this time, since the engine 10 is stopped, the mechanical pump MP moving together with the output shaft of the same engine 10 is also stopped so that the cooling water barely flows in the circulation passage A, bypass passage A3, circulation passage C, and circulation passage C. Incidentally, the state of the cooling system 20 shown in FIG. 5C corresponds to one just before the engine 10 is started, and it to be realized by the aforementioned "pre-heat control".

Hereinafter, the contents and the execution procedures of the aforementioned "pre-heat control" will be described in more detail.

Figure 6A:
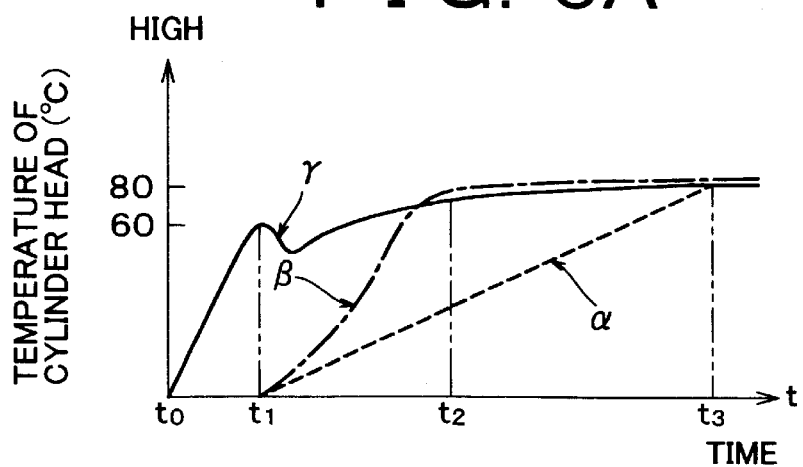
FIGS. 6A to FIG. 6C are time charts showing the temperature transition of a cylinder head, as the results of experimental modification of an operation mode of an electric pump of a heat accumulation container.
Figure 6B:
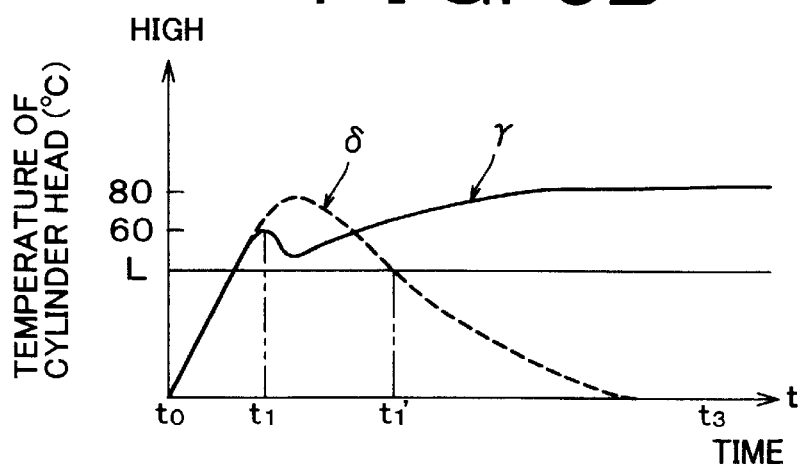
Figure 6C:
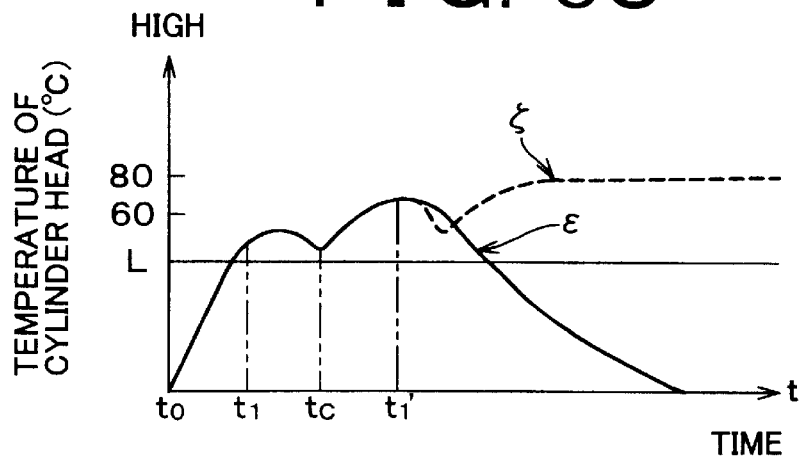

FIG. 6A, FIG. 6B, and FIG. 6C are time charts showing that the temperature transition of the cylinder head 10b becomes different as a result of experimental modification of the operation mode of the electric pump EP during the starting of the engine 10 for the engine system 100 shown in FIG. 2 to FIG. 5. Here, the time t1 corresponds to the engine starting time of the engine 10. A temperature transition pattern (called transition pattern, hereinafter) α shown by the broken line indicates the temperature transition of the case where the electric pump EP is not operated for starting the engine, while a temperature transition pattern β shown by the dashed line indicates the temperature transition of the case where the electric pump EP is started to operate at the same time as the engine starting. On the other hand, a temperature transition pattern γ shown by the solid line indicates the temperature transition of the case where the electric pump EP is started to operate a predetermined period of time (5 sec for this embodiment) prior to the engine starting. In respective transition patterns α, β, and γ, the engine 10 is supposed to be in the hot state, immediately prior to the end of the previous engine operation (when the engine stops) That is, it is supposed that water of a sufficiently high temperature is stored in the heat accumulator.

As shown in FIG. 6A, in the transition pattern α, the temperature of the cylinder heat 10b elevates gradually by the exothermic effect of the engine 10 itself according to the engine operation after engine starting (time t1 and thereafter). Depending on the environmental conditions such as the air temperature and the like, at t3 after ten and several seconds to several tens of seconds or so have elapsed after time t1, when the temperature of the cylinder head 10b (substantially equivalent to the cooling water temperature) reaches 80° C., the cooling water temperature (temperature of the cylinder head 10b) is maintained at a substantially constant temperature (80° C.) by repeated opening and closing of the thermostat 24 near the concerned temperature.

For the transition pattern β, the cooling water (hot water) stored in the heat accumulation container 21 at a temperature of approximately 80° C. or greater is to be supplied in the cylinder heat 10b at the same time as the starting of the engine 10. In this case, after the starting of the engine 10 (time t1 and thereafter), the temperature of the cylinder head 10b (substantially equivalent to the cooling water temperature) at time t2 after ten seconds or so have elapsed after the engine starting (time t1 and thereafter) reaches approximately 80° C., and thereafter the cooling water temperature (temperature of the cylinder head 10b) is maintained substantially at a constant temperature (80° C.).

In the transition pattern γ, hot water stored in the heat accumulation container 21 is to be supplied in the cylinder heat 10b prior to the starting of the engine 10. The inventors have confirmed that the temperature of the cylinder head 10b reaches a temperature equivalent to the cooling water temperature (60 to 80° C.) in the heat accumulation container 21 within approximately 5 to 10 seconds from the start of operation of the electric pump EP. In the transition pattern γ in FIG. 6, it is set to perform the starting of the engine 10 when 10 seconds have passed (time t1) after the start of operation of the electric pump EP at time t0.

Consequently, the engine 10 performs engine starting after the temperature of the cylinder head 10b has securely reached 80° C. Incidentally, according to the starting of the engine 10, cold cooling water (colder than the cooling water temperature in the circulation passage B) flows into the cylinder head 10b from a passage space other than the circulation passage B in the cooling system 20. Therefore, at time t1 and thereafter, the temperature of the cylinder head 10b drops slightly and temporarily; however, it elevates again with the continuous hot water supply from the heat accumulation container 21 and the exothermic effect of the engine 10 itself accompanying engine operation, and is maintained near 80° C. by the effect of the thermostat.

In the engine system 100 according to this embodiment, fuel supplied by injection to the engine 10 from the fuel injection valve 18 is atomized in the intake port 16, taken in the combustion chamber 11 while forming a mixture with fresh air and this mixture is then supplied for combustion, as mentioned with FIG. 4.

It is preferable that the temperature of the engine 10, especially the temperature of the inner wall of the intake port 16 formed in the cylinder head 10b, exceeds a predetermined temperature (60° C., and more preferably about 80° C.) in view of rapid atomization of injection supplied fuel in the intake port 16 and suitably maintaining this atomized state. If the temperature of the inner wall of the intake port 16 becomes lower, fuel tends to deposit on the same inner wall, making it difficult to atomize (evaporate) fuel efficiently, and to maintain the atomized (evaporated) fuel in that state. Such a disadvantage concerning fuel evaporation may make it difficult to optimize the combustion efficiency and the air-fuel ratio, and result in a deterioration of the discharge characteristics and fuel consumption.

When the engine 10 is in cold state, if the engine operation is sustained under the condition of no heat supply from the outside, it takes a relatively long time (time t1 to t3) for the temperature of the cylinder head 10b (intake port 16) to elevate sufficiently as shown by the transition pattern α in FIG. 6A. In addition, the deterioration of discharge characteristics and fuel consumption during warm up (time t1 to t2) is inevitable, even when hot water is supplied from the heat accumulation container 21 at the same time as, or immediately after, engine starting, in order to advance the warm up completion timing after engine starting as soon as possible, as shown by the pattern β in FIG. 6A.

Therefore, the engine system 100 is controlled (pre-heat control) so that cooling water is supplied from the heat accumulation container 21 to the cylinder head 10b prior to starting of the engine 10, and warm up is completed prior to the starting time of the engine 10 (shift the engine 10 from a cold state to a hot state), as shown by the pattern γ in FIG. 6A.

Nevertheless, it takes several seconds for the engine 10 to shift completely from the cold state to the hot state by supplying hot water from the heat accumulation container 21. If the engine starting time of the engine 10 that the driver intends is too early compared with the timing of this shift completion, the engine is made to start prior to shifting to the hot state, and the fuel is not able to be atomized sufficiently.

On the other hand, if the engine starting time of the engine 10 that the driver intends is too late, hot water stored in the heat accumulation container will be consumed wastefully compared with the timing of the shift completion.

Therefore, in the engine system 100 according to the invention, an specific, essential operation prior to starting the concerned engine 10, and whose operation timing is substantially identical each time, is detected as a trigger of preheating. Then, the time when this operation (trigger) is detected is taken as a timing element and the pre-heat start time (timing) is determined based on this timing element.

Figure 7:
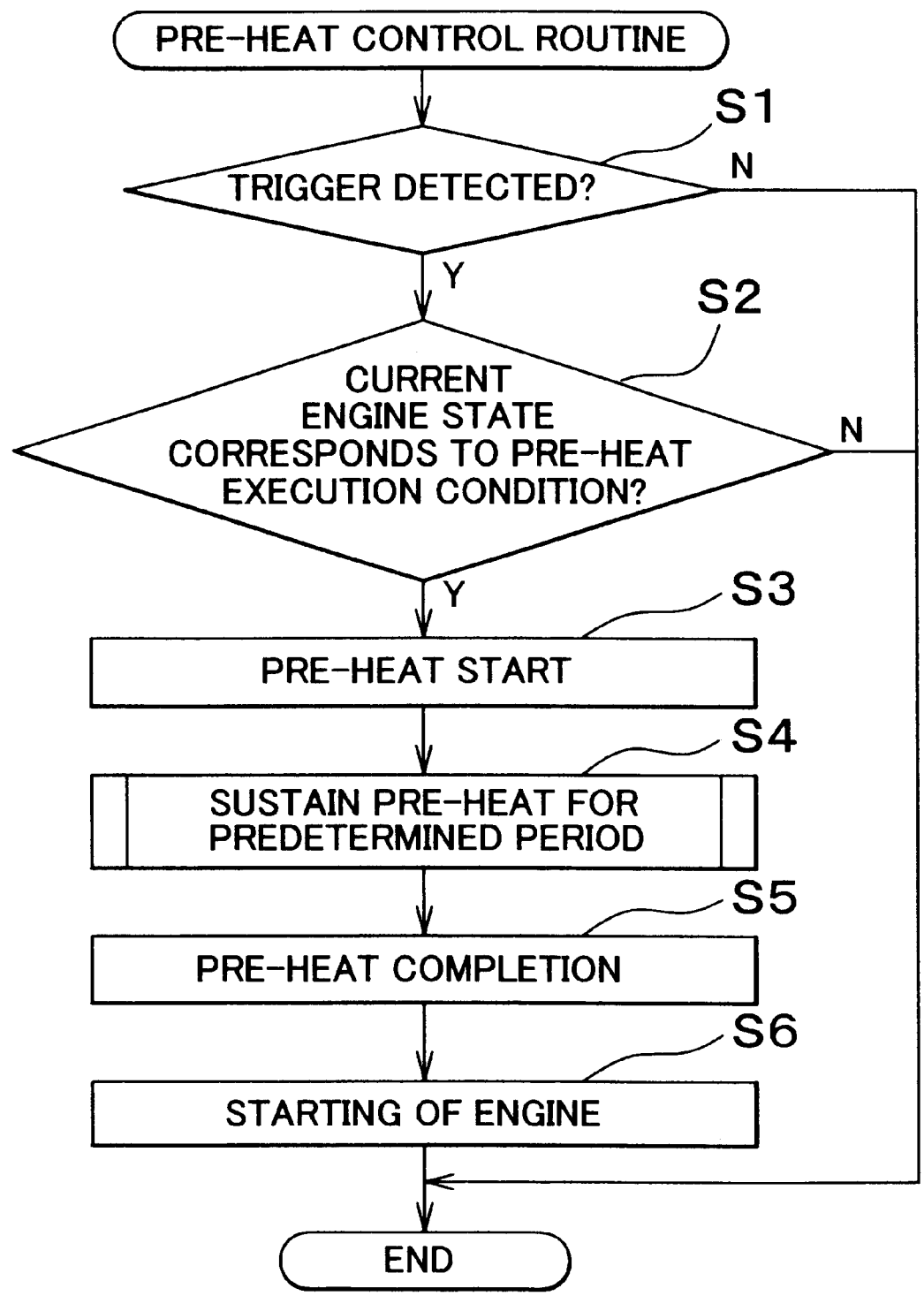
FIG. 7 is a flow chart showing a basic procedure for pre-heat control according to the same embodiment.

FIG. 7 shows the basic procedure for "pre-heat control" according to this embodiment. That is, the heat supply from the heat accumulation container to the engine 10 prior to starting of the concerned engine (pre-heat) is performed by the following procedure.

First, in step S1, the ECU 30 judges whether or not the specific operation (trigger) is generated prior to starting the engine 10. This trigger may be an artificial one caused by the act of the driver or others, or a non artificial one, provided that it concerns an event of some necessity for the generation prior to the starting of the engine 10.

Next, in step S2, conditions concerning the execution of pre-heat are set (or confirmed).

The condition concerning the execution of pre-heat may, for example, be the time from the execution start of pre-heat to the pre-heat completion, or judgment criteria for judging the pre-heat completion, for example, temperature elevation amount of the engine, supply amount of hot water supplied from the heat accumulation container to the engine. Moreover, the conditions as mentioned above may be operated based on the current environment (for example, engine temperature or air temperature), or determined referring to a map or the like. They may also be conditions during the pre-heat execution period (for example, flow rate of hot water supplied from the heat accumulation container to the engine).

Further, in step S2, in a case when the current environment corresponds to a condition not requiring preheating, for example, in a case when it already exceeds the cooling water temperature, it may judge not to execute the pre-heat.

Next, in step S3, the pre-heat is started and sustained based on, for example, the conditions set in step S2. Incidentally, a condition to prohibit the starting of the engine 10 according to the execution of this pre-heat may be added, so as to start the engine 10 when the warm up has definitely ended. As for the method for realizing the addition of such prohibitive conditions, the driver may be instructed (made to recognize) not to start the engine 10 while the pre-heat is sustained, or, automatic control wherein supplying hot water from the heat accumulation container is done in preference to engine starting, and a simultaneous execution of the same hot water supply and engine starting is prohibited. Also, a mechanical structure inhibiting to start the engine 10 prior to the pre-heat completion may be applied.

Thereafter, the engine 10 is started (step S6) after procedures such as pre-heat continuation for a predetermined period of time (step S4), completion (step S5) and the like. In step S6, the completion of pre-heat may be notified to the driver, and the actual starting of the engine 10 may be left to manual operation by the driver, or the ECU 30 or the like may control so as to perform the engine starting automatically after completion of pre-heat.

An operation presenting a high necessity of precedence over the engine 10 starting and a high reproducibility of operation timing is selected and the start timing of heat supply is determined based on this selected operation timing by performing the pre-heat control according to such basic procedures (control mode). Consequently, an appropriate heat supply start timing is set securely each time, and high reproducibility is assured for the temperature during the starting of the engine 10. In other words, the starting of the engine 10 can be performed after a secured shifting of the engine 10 to the hot state. Consequently, the disadvantages concerning the fuel evaporation are resolved, and the combustion efficiency and the air-fuel ratio can be optimized, and the discharge characteristics and fuel consumption can be improved.

Next, the "pre-heat control" that the engine system 100 of this embodiment performs prior to starting the engine 10 according to the aforementioned basic procedures (FIG. 7) will be described in detail referring to FIG. 8.

Figure 8:
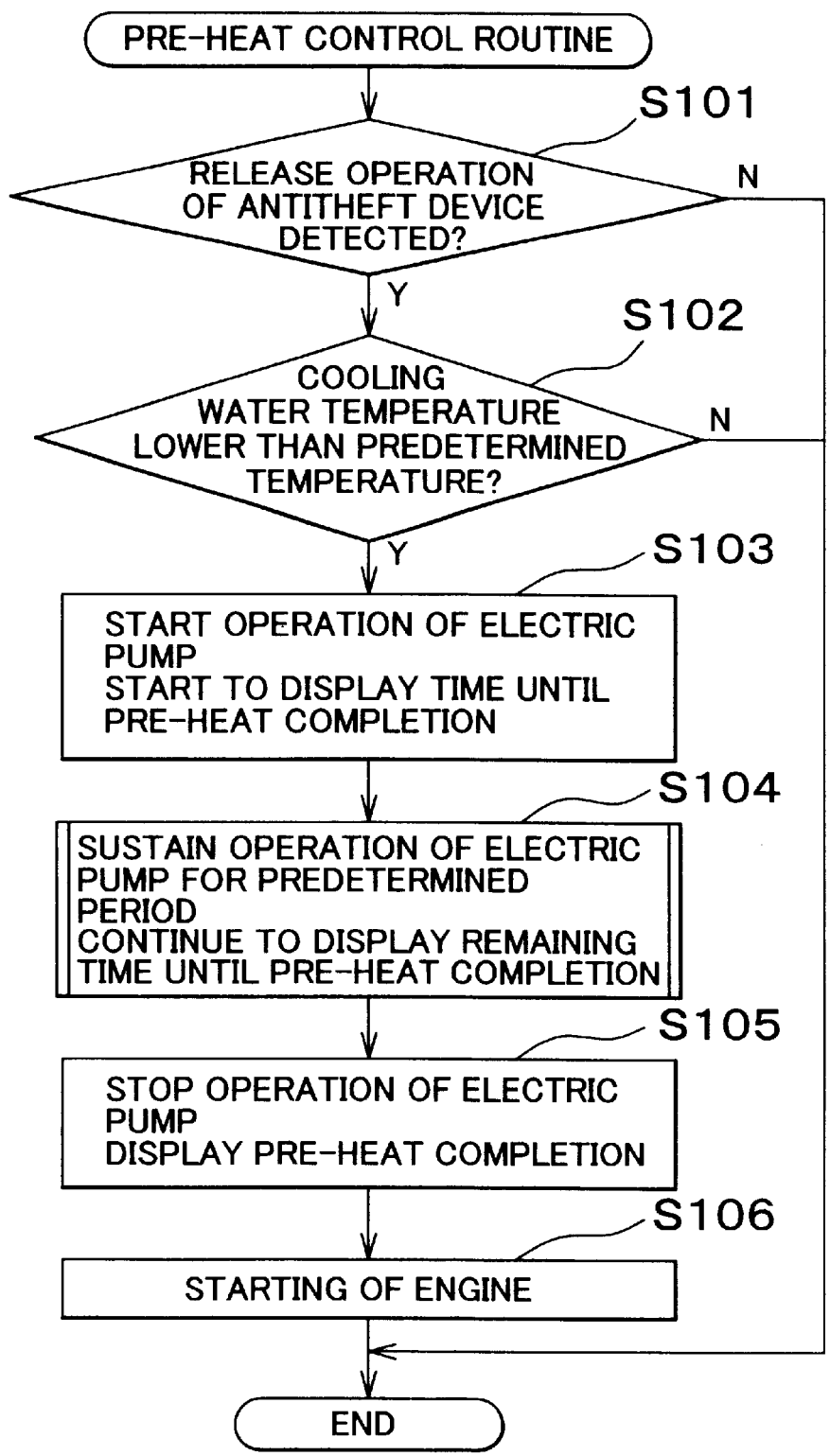
FIG. 8 is a flow chart showing a pre-heat control procedure according to a first embodiment of the invention.

FIG. 8 is a flow chart showing the process contents of the "pre-heat control routine" executed by the engine system 100 every predetermined interval of time while the engine 10 is stopped. The ROM 32 of the ECU 30 previously stores a program concerning the following routine.

When the process of the "pre-heat control routine" shown in FIG. 8 starts, first in step S101, it is judged whether or not the release operation of the antitheft is detected. If the judgment is positive, the process proceeds to step S102, and terminates this routine if the judgment is negative.

In step S102, it is judged if the actual engine state corresponds to the pre-heat execution condition. To be more specific, it is judged whether or not the temperature of cooling water (cooling water temperature) THW detected by the water temperature sensor 25 is lower than a predetermined temperature (preferably set to approximately 60° C.). If the judgment is positive, it is recognized that the engine 10 is in a cold state, and the process proceeds to step S103, to execute the pre-heat. On the other hand, it terminates this routine if the judgment in the same step S102 is negative.

In step S103, the operation of the electric pump EP is started, the hot water supply from the heat accumulation container 21 to the engine 10 is started, and at the same time, the time to the pre-heat completion (remaining time) is displayed on the screen of the display device 9.

Here, the operation of the electric pump EP is sustained for a predetermined period of time (for example 5 seconds) and the remaining time to the pre-heat completion is displayed consecutively on the screen of the display device 9 (step S104).

When the pre-heat is completed, the ECU 30 stops the operation of the electric pump EP and displays that the pre-heat has ended on the screen of the display device 9 (step S104).

Finally, in step S106, the ECU 30 drives the starter 26 and, at the same time, performs automatic starting of the engine 10 by starting to operate the fuel injection valve 18 (fuel supply to the engine 10) and turning on the spark plug 19a through the igniter 19.

Incidentally, the process in the respective steps of the aforementioned "pre-heat control routine" corresponds to the process in any of the steps in the previous basic procedures (FIG. 7). That is,step S101 (FIG. 8) corresponds to step S1 (FIG. 7), step S102 (FIG. 8) to step S2 (FIG. 7), step S103 (FIG. 8) to step S3 (FIG. 7), step S104 (FIG. 8) to step S4 (FIG. 7) and step S105 (FIG. 8) to step S5 (FIG. 7), respectively.

Figure 9:
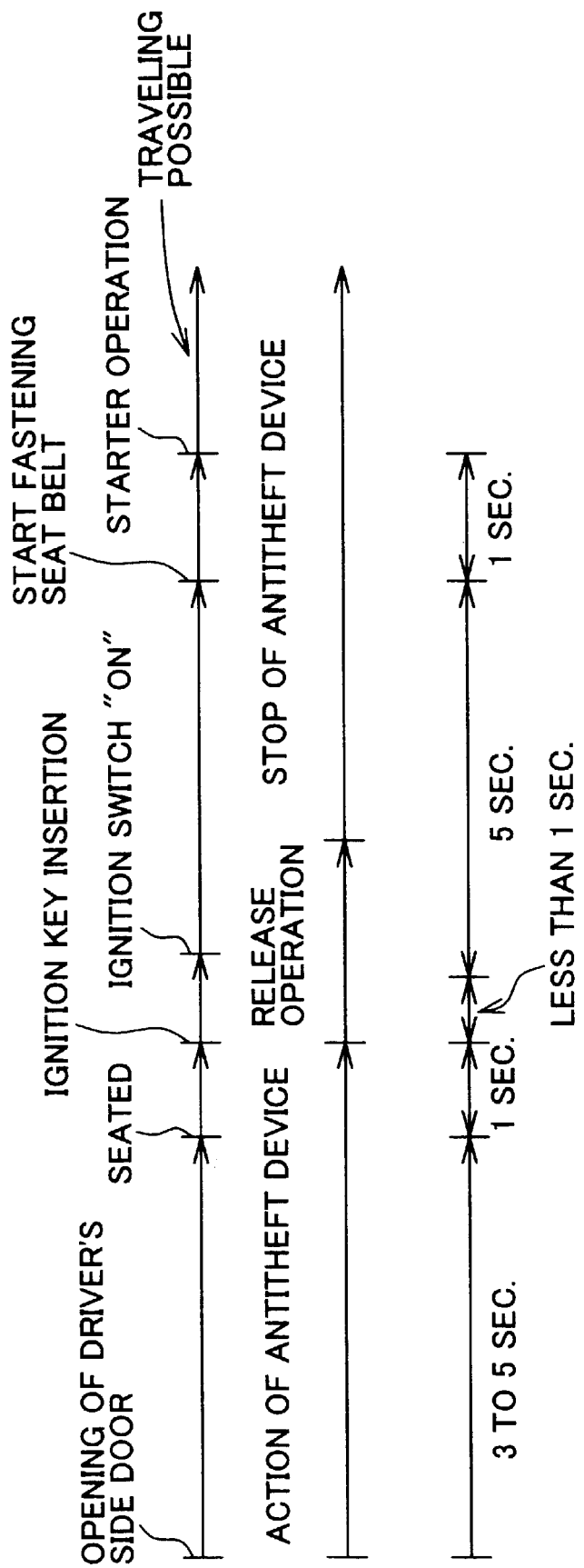
FIG. 9 is a time chart showing the timing of a series of operation from opening of a driver's seat side door to the operation of a starter.

Here, as shown in the time chart of FIG. 9, a series of operations including (1) opening of the driver's seat side door 3→(2) sitting in the driver's seat 2→(3) insertion of the ignition key 5A into the key cylinder 5→(4) start of release operation of the antitheft device→(6) switching ON of the ignition switch→(7) end of release operation of the antitheft device→(8) start of fastening the seat belt→operation of the stator 26, can be said to be operations previous to the starting of the engine 10 and almost essential for the driver of a vehicle with the engine system 100 installed. In this operation procedure, it is confirmed by the Inventors that respective elapsed time from the execution period of various operations (1) to (8) to the operation of the stator are almost independent, for example, of sex, physical build and the like of the driver, and can be specified as values without individual difference and presenting relatively high reproducibility.

Thus, engine starting can be performed in a state where the engine 10 is almost out of the cold state by starting the pre-heat earlier than starting the concerned engine 10 (operation of the stator 26) by approximately 5 to 10 seconds, as shown by the transition pattern γ in the forgoing FIG. 4.

In other words, if any execution timing among respective operations (1) to (8) is selected as one element (timing element), an appropriate pre-heat start timing prior to the starting of the engine 10 (for example, 5 seconds prior to the starting of the engine) can be determined based on this timing element.

In the aforementioned "pre-heat control routine", the release operation of the antitheft device is selected as an event generating out of necessity prior to the starting of the engine 10, and the pre-heat is started based on the generation timing of the selected event. The start timing of the release operation of the antitheft device is not only of high necessity as an event generating prior to the starting of the engine 10, but also has high reproducibility of the time length from its start timing to an arbitrary starting timing of the engine 10.

Consequently, the pre-heat is executed in a most preferable mode by starting the pre-heat synchronously with the start timing of release operation of the antitheft device, or at a predetermined timing based on the timing. That is, the pre-heat is in a completed state at the time of starting of the engine 10, even when the engine 10 is started at an arbitrary timing.

Here, if the time necessary for the release operation of the antitheft device is shorter that the time necessary for the pre-heat, sufficient heat supply to the engine 10 by the heat accumulator 21 will not be completed, even when the release operation of the antitheft device has ended. Even in such a case, the comfort of the driver when starting the engine can be ensured conveniently by informing the driver of the remaining time prior to completion of pre-heat or the like as by the series of operation in steps S104 to S106 in the aforementioned "pre-heat control routine".

Alternatively, the driver may be made to recognize that the release operation of the antitheft device is still continuing by sustaining the release operation of the antitheft device at least until the end of preheating or further thereafter, and displaying the time remaining until the end of the same release operation, showing that the release operation of the antitheft device is still sustained. The comfort concerning the operation is suitably ensured when starting the engine 10 by also affording such artificial recognition to the driver.

In either case, the reproducibility of the sustention time of release operation of the antitheft device, that is, the length of time spent from its start timing to an arbitrary starting timing of the engine 10, is sufficiently high, and only a short time is spent from the insertion of the ignition key into the key cylinder 5 for starting the engine 10 to the starting of the engine 10, and this length is almost identical every time. Thus, the driver hardly feels any inconvenience about the operation concerning engine starting.

As mentioned above, according to the "pre-heat control routine", executed by the engine system 100 according to this embodiment, an event generated by necessity prior to the starting of the engine 10, and having high reproducibility of its generation timing is selected as a timing element, and the pre-heat period is controlled based on the same timing element, allowing engine operation to start when, at least, the temperature range where problems may occur concerning the atomization of supplied fuel has been securely exceeded after the engine 10 is definitely no longer in a cold state.

Consequently, the disadvantages concerning the fuel evaporation (atomization) during engine starting are resolved, and the combustion efficiency and the air-fuel ratio can be optimized, and the discharge characteristics and fuel consumption can be improved.

In addition, as the second embodiment of the invention, the opening operation of the driver's side door 3 can be applied in place of the aforementioned starting of release operation of the antitheft device.

Figure 10:
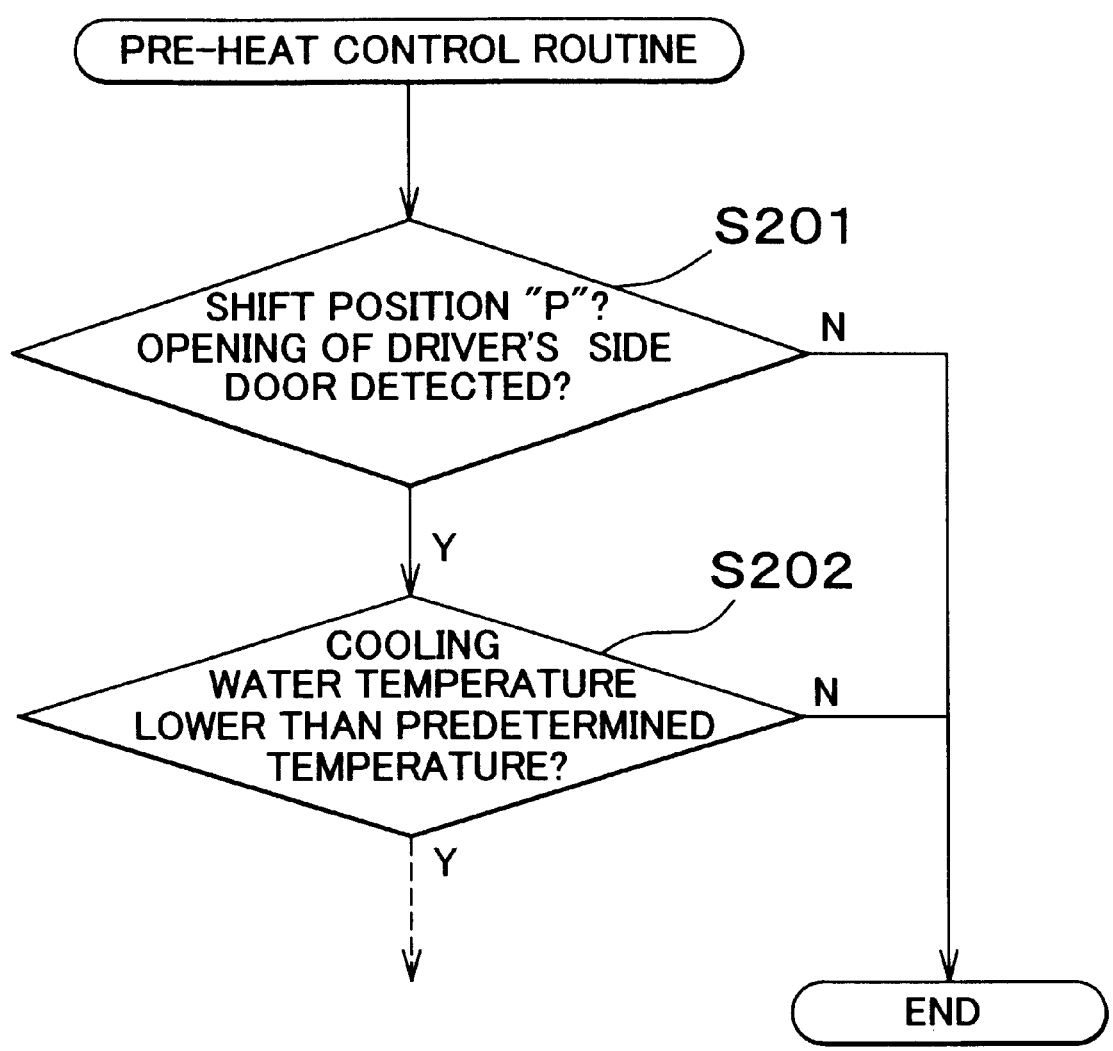
FIG. 10 is a flow chart showing a part of pre-heat control according to another embodiment.

In this case, for example, the process of step S201 in the aforementioned "pre-heat control routine" (FIG. 8) may be replaced by the process shown in FIG. 10.

Namely, in step S101, in the state where the shift lever 8 position (shift position) is in the position for parking (park position), the ECU 30 judges whether the opening operation of the driver's side door 3 is detected or not. If this judgement is positive, process proceeds to step S202, and terminates the "pre-heat control routine" if this judgment is negative. At this time, the position of the shift lever 8 can be judged based on the output signal from the shift position sensor 8a, and the opening operation of the driver's side door 3 can be judged based on the output signal from the door opening/closing sensor 3a, respectively.

Further, effects almost equivalent to those by the aforementioned "pre-heat control routine" of FIG. 10 can be expected by applying the lock release operation of the driver's seat side door 3 in place of the opening operation of the driver's side door 3 as the aforementioned trigger. In this case, the ECU 30 may judge whether or not the lock of the driver's side door 3 is released based on the output signal from the door lock sensor 3b.

Here, as shown by a temperature transition δ in FIG. 6, the temperature of the cylinder head 10b elevates to approximately 80° C. (temperature of hot water stored in the heat accumulation container) and, thereafter, drops gradually, at time t1 and thereafter, in the case of sustaining the hot water supply from the heat accumulation container 21 to the cylinder head 10b started at time t0 without starting the engine 10. At this time, supposing the lower limit value of the temperature of the cylinder head 10b desirable for performing an appropriate starting of the engine 10 is a temperature L, the temperature of the cylinder head 10b becomes lower than the temperature (lower limit value) L at time t1' and thereafter. In other words, the effect of warming up of the engine 10 by pre-heat is reduced.

There, the consumption speed of hot water in the heat accumulation container can be substantially lowered all the way maintaining the temperature of the cylinder head 10b higher than the lower limit value L, by temporarily stopping the supply when some of the hot water stored in the heat accumulation container 21 is supplied to the cylinder head 10b, and resuming the supply when a predetermined period of time has elapsed. That is, as shown by the temperature transition in FIG. 6C, the temperature of the cylinder head 10b higher than the lower limit value L can be maintained even when, for example, time t1' has elapsed by temporarily stopping the hot water supply started at time t0 near time t1, and resuming the supply at time tc. Incidentally, if the engine 10 is started near time t1', the temperature of the cylinder head 10b elevates rapidly to near 80° C. without dropping under the lower limit value L, as shown by the temperature transition.

In the engine system 100 according to this embodiment, the ECU 30 controls the operation of the electric pump EP so that the temperature transition of the cylinder head 10b prior to and after the starting of the engine 10 realizes the transition pattern ξ in FIG. 6C.

That is, the ECU 30 previously selects an event generating necessarily prior to starting the engine 10, and starts pre-heating according to the timing at which the event occurs. After the start of the pre-heat, hot water stored in the heat accumulation container 21 is discharged discontinuously by a predetermined amount to the circulation passage B (engine side passage B2) by temporarily stopping the electric pump EP after operating it for a predetermined period of time, and thereafter resuming its operation when the predetermined period has elapsed.

Figure 11:
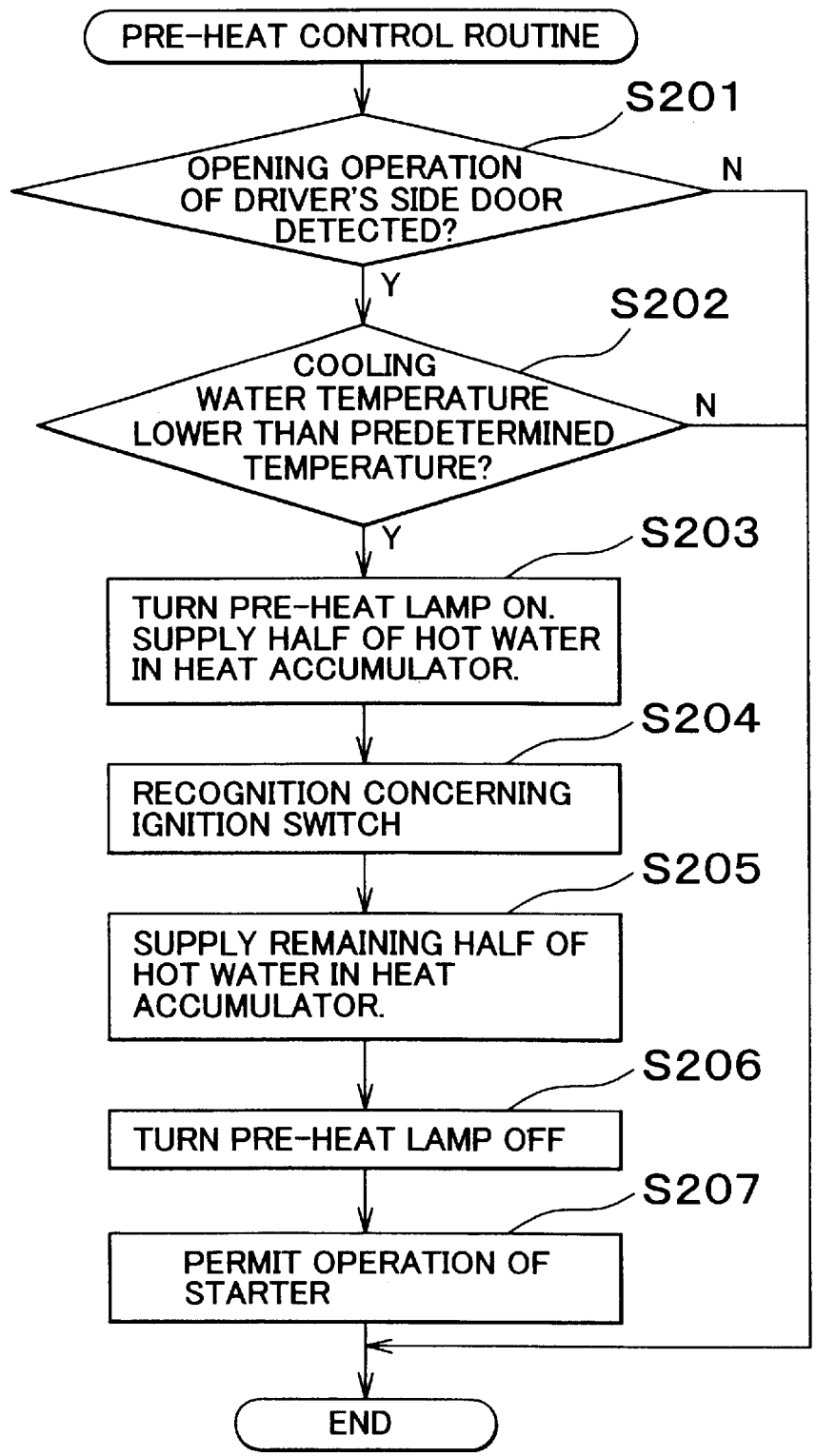
FIG. 11 is a flow chart showing the pre-heat control according to a second embodiment.

Next, a concrete control procedure for discharging hot water stored in the heat accumulation container several times to the cooling route after starting the pre-heat of the engine system 100 will be described referring to the flow chart of FIG. 11. FIG. 11 is a flow chart showing the process contents of "pre-heat control routine" executed by the engine system 100 when the engine 10 is stopped. ROM 32 of the ECU 30 stores in advance a program concerning the following routine.

This routine recognizes the opening/closing operation of the driver's seat side door 3 based on the output signal from the door opening/closing operation sensor 3a as a necessary operation performed by the driver prior to starting the engine 10, and judges whether or not the opening operation of the driver's side door 3 (step S201). For instance, in step S201, the ECU 30 shifts the process to step 202 upon detection of the opening operation of the driver's side door 3 in a state where the engine 10 is stopped, and terminates this routine if this judgment is negative.

In step S202, it is judged whether the current engine state corresponds to the pre-heat execution condition. To be more specific, if the temperature of cooling water (cooling water temperature) THW detected by the water temperature sensor 25 is below a predetermined temperature (preferably set to approximately 60° C.), it is recognized that the engine 10 is in a cold state, and the process proceeds to step S203 to execute the pre-heat. On the other hand, if the current engine state does not correspond to the pre-heat execution condition, or if the judgment in step S202 is negative, the pre-heat is not executed in this routine (at engine starting this time).

In step S204, the operation of the electric pump EP is started to start a hot water supply from the heat accumulation container 21 to the engine 10 and the driver is informed that pre-heat is being executed by the lighting of the pre-heat lamp 28. Here, the operation of the electric pump EP is sustained until half of the total hot water amount stored in the heat accumulation container 21 is discharged to the circulation passage B (engine side passage B2) and then stopped. Incidentally, the temperature of the cylinder head 10b sufficiently exceeds the lower limit value L described in FIG. 6B or 6C when half of hot water stored in the heat accumulation container 21 is discharged into the circulation passage B2.

In the following step S204, operation of the ignition switch is recognized by the operation of the ignition key 5A being inserted into the key cylinder 5.

Figure 12:
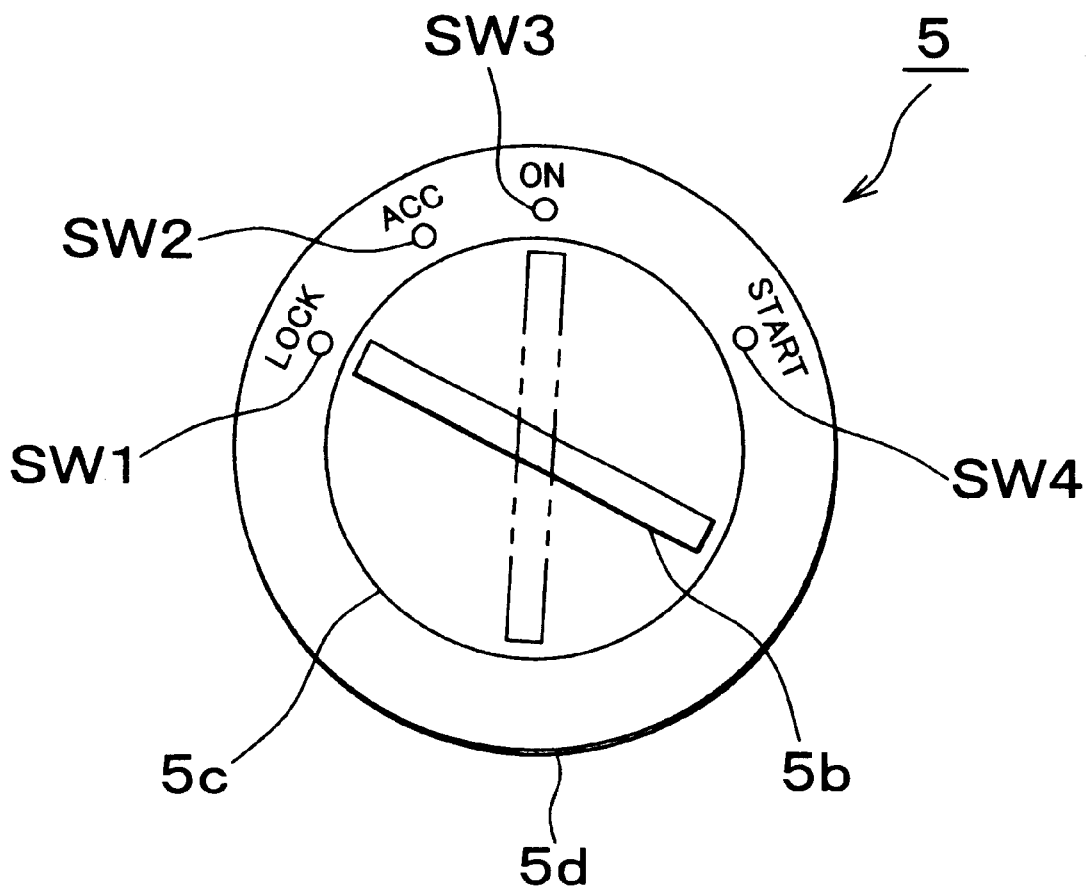
FIG. 12 is a plan view of a key cylinder viewed in the insertion direction of ignition key.

As shown in FIG. 12, viewed in the insertion direction of the ignition key 5A, the key cylinder 5 comprises a circular rotor 5c having a slit 5b to insert the key 5A, and an annular case 5d surrounding the outer periphery of the circular rotor 5c with its own inner periphery. The case 5d constitutes the exterior of the key cylinder 5 body, and is fixed, for example, to an operation panel (not shown) of the driver's seat. The rotor 5c is formed so as to rotate within a limited range with respect to the case 5d when the ignition key 5A inserted in the slit 5b is turned. The ignition key 5A can be inserted into the slit 5b when the end of the slit 5b in the longitudinal direction is aligned with a position SW1, marked "LOCK" on the case, as shown by the solid line in FIG. 12.

When starting the engine 10, first, the driver (operator) inserts the ignition key 5A into the slit 5b and rotates it from the position SW1, marked "LOCK", to a position SW2, marked "ACC", such that the main power source of peripheral equipment including room lamp (not shown), audio (not shown), or navigator (not shown) is turned "ON". If the same ignition key 5A is further rotated to a position SW3, marked "ON" (shown by the two dot chain line in FIG. 12), a main relay for activating a function that executes driving control of the engine 10 for the ECU 30 is turned "ON". If the same ignition key 5A is further rotated to a position SW4, marked "START", the starter 26 operates to cranking the engine 10, and fuel injection supply by the fuel injection valve 18 and ignition of the evaporated fuel by the igniter 19 start in synchronization with this cranking operation. As part of the process by this routine, the ECU 30 regulates (locks) the rotation movement from the position SW3 to the position SW4 of the ignition key 5A inserted into the key cylinder 5 following the process transition to step S103.

In the same step S204, if it is recognized that the ignition key 5A is further rotated to the position SW3, marked "ON", the electric pump EP is started again to discharge (half of) the hot water remaining in the heat accumulation container 21 to the engine side passage B2 (step S205). As a result the total amount of hot water stored in the heat accumulation container 21 is discharged into the engine side passage B2.

Thus, when the total amount of the hot water in the heat accumulation container 21 is completely discharged, the ECU 30 turns off the pre-heat lamp 28 in the following step 106.

Last, in step S207, the ECU 30 releases the control (lock) of the rotation movement of the ignition key 5A from the position SW3 to the position SW4. That is, the driver of the vehicle 1 can rotate the ignition key 5A to the position SW and start the engine 10.

After passing through the same step S207, the ECU 30 stops the process in this routine.

According to the process procedure mentioned above, the ECU 30 executes the pre-heat control prior to starting the engine 10.

In the aforementioned "pre-heat control routine", the electric pump EP is operation controlled to temporarily suspend the hot water supply to the cylinder head 10b at the point when the temperature of the cylinder head 10b has elevated to some extent, and to resume after a predetermined period of time. Incidentally, the period of time elapsed from the temporary suspension of the electric pump EP in step S203 of the aforementioned "pre-heat control routine" until the electric pump EP operation resumes in step 205 is sufficiently short (about 5 seconds in this embodiment), and meanwhile, the temperature of the cylinder head 10b does not drop under the lower limit value L described previously with FIG. 6B or FIG. 6C.

In other words, according to this embodiment, a finite amount of hot water stored in the heat accumulation container 21 can be used for a period of time longer than in the case where the total amount of hot water stored in the heat accumulation container 21 is discharged (consumed) continuously by executing the pre-heat based on a discontinuous operation mode of the aforementioned electric pump EP. Therefore, the temperature of the cylinder head 10b, once elevated, is substantially prevented from dropping again, even when the starting timing of the engine 10 is delayed for some reason.

Moreover, the temperature of the cylinder head 10b elevates to the temperature of hot water (around 80° C. in this embodiment) in a short period of time by supplying the cylinder head 10b maintaining a predetermined temperature level (temperature exceeding the lower limit L in this embodiment) again with hot water. Therefore, the pre-heat is securely completed when the engine 10 is to be started, even when the engine 10 is to be started at an arbitrary timing, by resuming the hot water supply immediately prior thereto (at a timing when the ignition switch is turned "ON" in this embodiment).

Consequently, engine operation can be started when at least the temperature range where problems may occur concerning the atomization of supplied fuel has been surely exceeded after the engine 10 is definitely no longer in a cold state.

Consequently, the disadvantages concerning the fuel evaporation (atomization) during engine starting are resolved, and the combustion efficiency and the air-fuel ratio can be optimized, and the discharge characteristics and fuel consumption can be improved.

The above advantages are also displayed with the installability of the heat accumulation container 21 (heat accumulating apparatus) in the vehicle 1 since the capacity of the accumulation container 21 is not increased for obtaining these effects.

In this embodiment, supply of half of hot water in the heat accumulation container 21 is started according to the opening/closing of the driver's side door 3, and next, supply of the remaining half is started when the ignition switch is turned "ON".

In addition, a depressing operation of the brake pedal 7 prior to starting the engine 10 can also be applied as a trigger for pre-heat in place of the start of release operation of the antitheft device in the aforementioned first embodiment, or opening operation of the driver's side door 3 in the aforementioned second embodiment.

Figure 13:
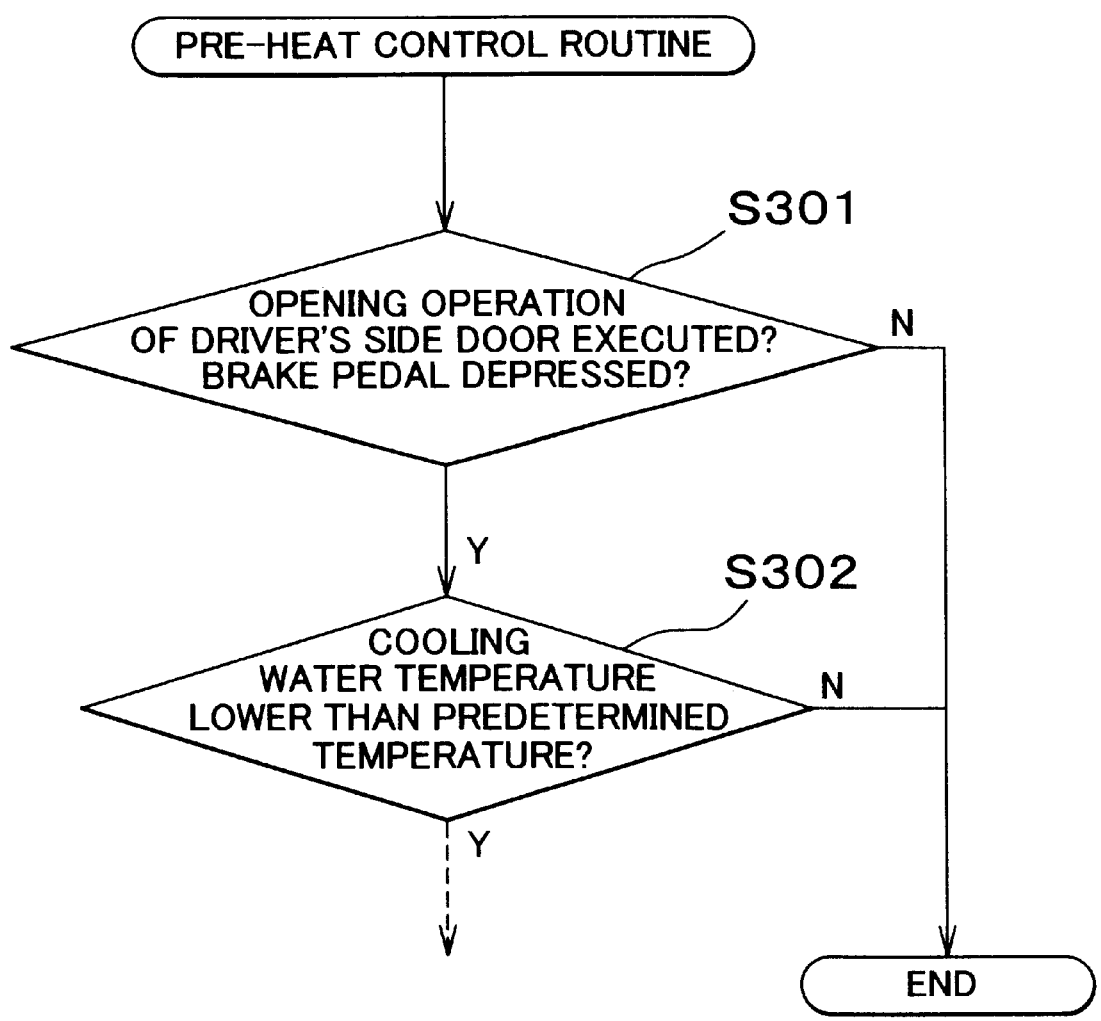
FIG. 13 is a flow chart showing a part of pre-heat control according to another embodiment.

In this case, for example, the process of step S101 of FIG. 8 or step S201 of FIG. 11 in the aforementioned "pre-heat control routine" may be replaced by step 301 shown in FIG. 13.

In other words, the ECU 30 judges whether or not the depressing operation on the brake pedal 7 is detected in a state where the position of the shift lever 8 (shift position) is in the position for parking (park position) in step S301 and shifts the process to step 302 if the judgment is positive and terminates the "pre-heat control routine" if this judgment is negative. Here, the depressing operation of the brake pedal 7 can be judged respectively based on the output signal from the brake sensor 7*a*.

Also, the seat belt fastening operation prior to starting the engine 10 can also be applied as a trigger for pre-heat in place of the start of the release operation of the antitheft device, or opening operation of the driver's side door 3.

Figure 14:
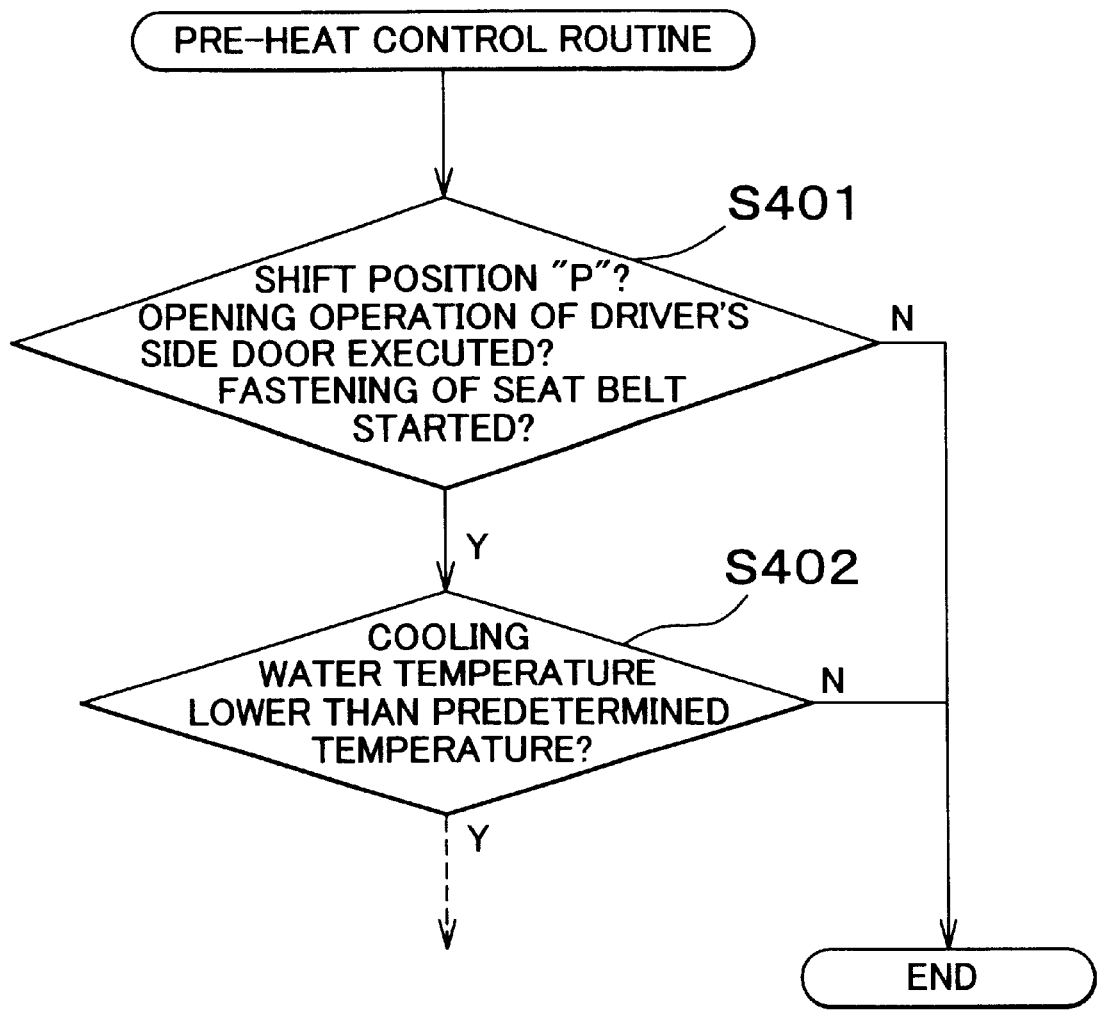
FIG. 14 is a flow chart showing a part of pre-heat control according to another embodiment.

In this case, for example, the process of step S101 of FIG. 8 or step S201 of FIG. 11 in the aforementioned "pre-heat control routine" may be replaced by the process shown in FIG. 14.

In other words, the ECU 30 judges whether or not the door opening of the driver's side door 3 and the start of the seat belt fastening operation are detected as a series of operations in a state where the position of the shift lever 8 (shift position) is in the position for parking (park position) in step S401 and shifts the process to step 202 if the judgment is positive and terminates the "pre-heat control routine" if this judgment is negative. Here, the shift lever 8 position can be judged based on the output signal from the shift position sensor 8*a*, the opening operation of the door 3 based on the output signal from the door opening/closing sensor 3*a*, and the seat belt fastening operation based on the output signal from the seat belt sensor 4*a* attached to the inner buckle 4, respectively.

Also, the operation of the driver sitting in the driver's seat prior to starting the engine 10 can also be applied as a trigger for pre-heat in place of the start of release operation of the antitheft device, or opening operation of the driver's side door 3.

Figure 15:
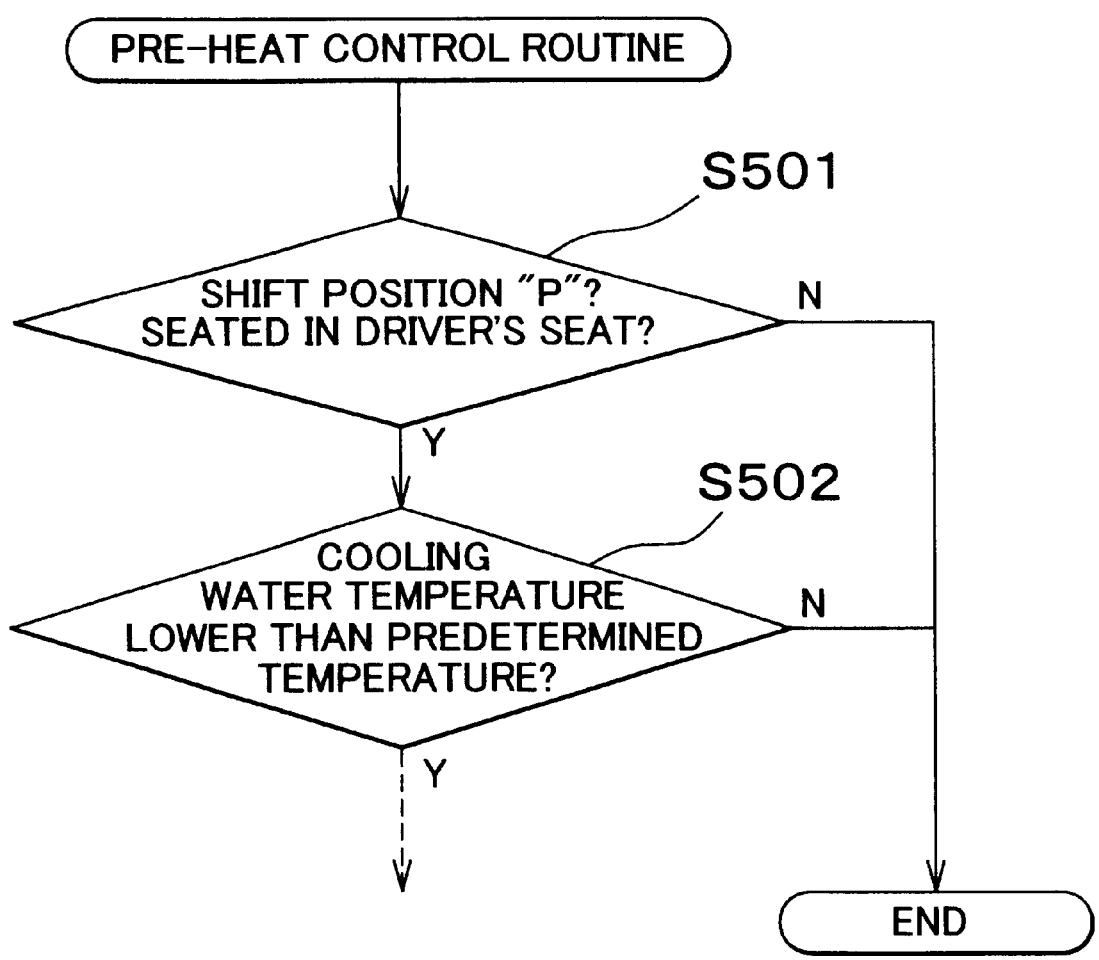
FIG. 15 is a flow chart showing a part of pre-heat control according to another embodiment.

In this case, for example, the process of step S101 of FIG. 8 or step S201 of FIG. 11 in the aforementioned "pre-heat control routine" may be replaced by the process shown in FIG. 15.

In other words, as shown in FIG. 15, the ECU 30 judges whether the driver is seated on the driver's side seat in a state where the position of the shift lever 8 (shift position) is in the position for parking (park position) in step S501 and shifts the process to step 502 if the judgment is positive and terminates the "pre-heat control routine" if this judgment is negative. Here, the recognition of the driver being seated in the driver's seat is made based on the output signal from the sitting sensor 2*a* built in the driver's seat.

Equally, a depressing operation of the clutch pedal prior to starting the engine 10 can also be applied as a trigger for pre-heat in place of the start of release operation of antitheft, or opening operation of the driver's side door 3.

In addition, trigger for pre-heat pedal prior to starting the engine 10 can also be left to the driver's will in place of the start of release operation of the antitheft device, or opening operation of the driver's side door 3.

Figure 16:
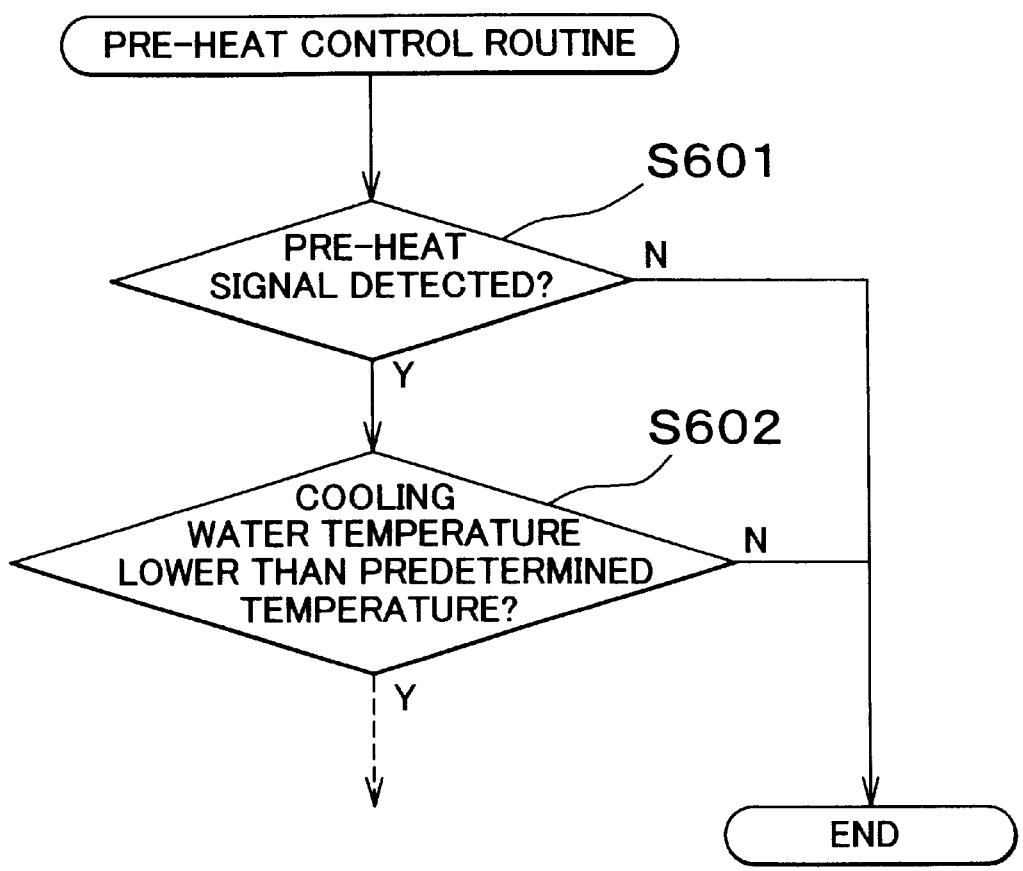
FIG. 16 is a flow chart showing a part of pre-heat control according to another embodiment.

In this case, for example, the process of step S101 of FIG. 8 or step S201 of FIG. 11 in the aforementioned "pre-heat control routine" may be replaced by step S601 shown in FIG. 16.

In other words, in the process as shown in FIG. 16, the ECU 30 judges whether a command signal concerning the pre-heat execution in step S601, and shifts the process to step 602 if the judgment is positive and terminates the "pre-heat control routine" if this judgment is negative. Here, the command signal concerning the pre-heat execution may be output, for example, from the display device 9. That is, the apparatus may be formed to display a well-known touch panel (operation panel) on the screen of the display device 9, and to output a command signal concerning the pre-heat execution by a touch operation of the driver to the same touch panel.

The pre-heat execution taking the driver's will as a trigger may be performed not only according to the configuration through the display device 9, but also through remote operation, for example, by building a transmitter for outputting the command signal concerning the pre-heat in the ignition key 5A or the like.

Also, the pre-heat may also be executing by providing the ECU 30 with a well-known voice recognition function, emitting a vocal command by the driver through, for example, a sound sensor (microphone) 9*a*, and taking this vocal command as s trigger.

Adoption of such a configuration allows the driver himself/herself of a vehicle in which the internal combustion engine is installed to easily execute the hot water supply prior to the starting of the internal combustion engine, thereby improving the convenience concerning the operation of the heat accumulator.

In addition, the operation of ignition switch as FIG. 12 can be applied as a trigger for pre-heat to the starting of the engine 10 in place of the aforementioned start of release operation of the antitheft device.

That is, as shown in FIG. 12, the rotation to the position SW3 marked "ON" of the ignition key 5A (switching operation to "ON" of the ignition switch) is a necessary operation prior to starting the engine 10. It is confirmed by the Inventors that the period of time from the timing of the operation to the starting timing of the engine 10 (around 5 seconds) is almost without individual difference and is highly reproducible.

Consequently, effects equivalent or similar to the aforementioned embodiment can be expected by substituting step S101 of FIG. 8 or step S102 of FIG. 11 in the "pre-heat control routine" with such an ignition switch switching operation, and applying it as a trigger.

Figure 17:
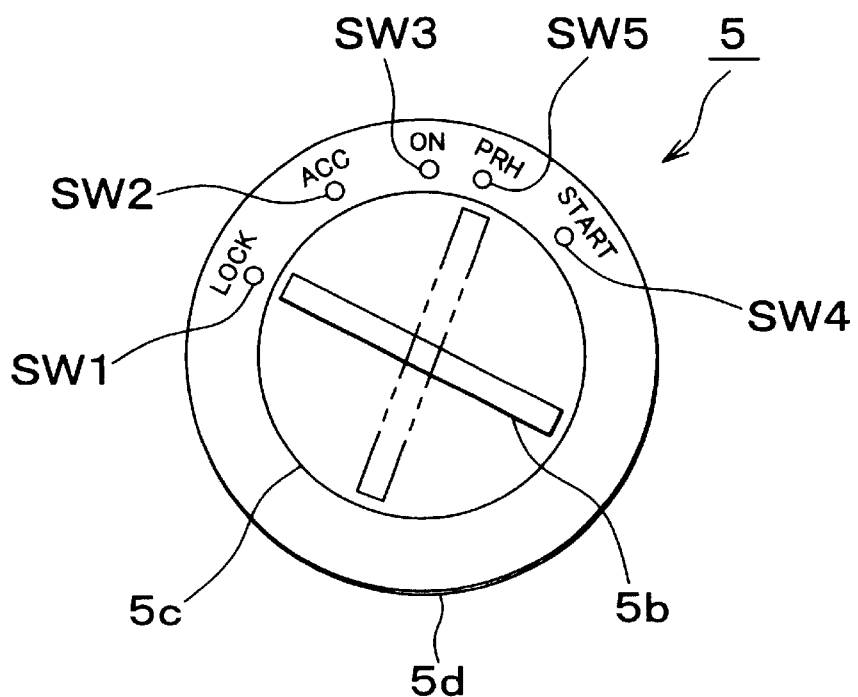
FIG. 17 is a plan view of a key cylinder according to another embodiment viewed in the insertion direction of an ignition key.

Further, another aspect shown, for example, in FIG. 17 can be applied to the configuration of the key cylinder 5. That is, an indication "PRH" is arranged between the position SW3 marked "ON" and the position SW4 marked "START" in addition to indications "LOCK", "ACC", "ON" and "START", on the case 5d of the key cylinder 5. Then, the ECU 30 starts to pre-heat when the driver intentionally turns the ignition key 5A inserted in the key cylinder 5 to the position SW5 marked "PRH" through the position SW3 marked "ON" for starting the engine 10. According to such a configuration of the key cylinder 5 and the function of the ECU 30 related to the same configuration, a series of procedures from the intention of the driver to start the engine 10 to the starting of the engine 10 through the execution/completion of pre-heat is performed promptly by a single operation of rotation of the ignition key 5A in one direction, since the pre-heat is started based on the driver's intention, as well as by necessity prior to starting the engine 10. Consequently, a sense of discomfort by the driver is limited to a minimum, even if the starting of the engine 10 is prohibited until the completion of pre-heat.

The embodiment in which the function of the stator 26 is prohibited is not limited to one in which the stator 26 is not allowed to operated even when the ignition key 5A is turned to the "START" position SW4; for example, the operation of the ignition key 5A inserted in the key cylinder 5 to the "START" position SW5 may be regulated or locked mechanically or electro-magnetically. Further, it may also control so that the fuel injection valve 18 does not operate (does not injection supply fuel) even when the starter 26 operates, and as the result, the engine 10 does not start.

In addition, it may be learned which event is most appropriate as a trigger after execution of "pre-heat control" each time the engine is started in order to reflect the personality and the like of the driver.

In the aforementioned second embodiment, three or more kinds of triggers such as a third trigger, fourth trigger and so on may be set in addition to the second trigger, with control such that the starting and stopping of the hot water supply is repeated intermittently. Further, after detecting the first trigger, the hot water supply can be stopped or resumed according to the elapsed time thereafter and the temperature of the cylinder head 10b.

Also, upon executing three or more intermittent hot water supplies prior to starting the aforementioned engine 10, at least one hot water supply may be controlled so as to be performed at the same time as the starting of the engine 10. Such control mode allows for further improvement of the discharge characteristics and fuel consumption related to the starting of the engine 10.

Here, "prior to" starting the engine 10 means "before", including the starting time of the engine 10. For example, in a case when the temperature of hot water stored in the heat accumulation container 21 is 80° C., even if the engine 10 is started when the temperature of the cylinder head 10b has elevated to approximately 50° C. to 75° C., the discharge characteristics and fuel consumption in the initial phase of the starting of the engine 10 are certainly improved sufficiently, however, it can reasonably be expected that the discharge characteristics and fuel consumption in the initial phase of the starting of the engine 10 are improved still further by sustaining the hot water supply thereafter.

The amount of hot water discharged to the engine side passage B2 by hot water supply each time may not be equivalent.

Also, effects equivalent or similar to the aforementioned embodiment can be expected by substituting the control mode of discharging a predetermined amount of hot water, of hot water stored in the heat accumulation container 21, intermittently to the engine side passage B2 with a control to repeat the increase/decrease of the flow rate of hot water directed to the cylinder head 10b from the heat accumulation container 21, for example, by changing the driving force of the electric pump EP.

Also, as for procedures corresponding to steps S3 to S5 of the basic procedure shown in FIG. 7, the driver may be informed of pre-heat start, continuation or completion through the sound emitted by the speaker 29 or the lighting operation of the lighting lamp 28.

According to the control procedure in the aforementioned "pre-heat control routine", for example, in step S102, if the cooling water temperature exceeds a predetermined temperature, the pre-heat is not executed, or it is held. On the contrary, for example, the pre-heat execution period or output of the electric pump may be made continuously variable according to the degree of the cooling water temperature, improving the economy of electricity consumed by the electric pump EP and the warm up efficiency by the pre-heat. Further, if the control mode to prohibit the engine 10 from starting during the pre-heat execution is adopted, conditions (control) may be set to relax the prohibition condition by releasing the starting prohibition (regulation) of the engine 10 or shortening the prohibition period, while performing the pre-heat, when the cooling water temperature is equal to or below a predetermined temperature.

Though in the "pre-heat control routine" of the aforementioned embodiment it is controlled to perform the automatic starting of the engine 10 after the release of the starting prohibition of the engine 10 (step S106 in FIG. 8), after the end of pre-heat, the driver may simply be informed of the pre-heat completion to start the engine 10 manually.

In addition, in the aforementioned embodiment, the output signal from the water temperature sensor 25 or the temperature of cooling water (cooling water temperature) THW detected in one region of the cooling system was adopted as a parameter representing the temperature of the engine 10. Nevertheless, another detection means for obtaining information reflecting the temperature of engine 10 or the temperature of intake port 16 may also be adopted. For instance, a sensor for directly detecting the temperature of the engine 10 body or the temperature in the intake port 16 may be installed, or an oil temperature sensor for detecting the lubricant oil temperature may be disposed. In addition, water temperature sensors may be disposed in a plurality of points in the cooling system for increasing detection accuracy.

Substantially independent cooling water circulation passages are formed in the cylinder block 10a and the cylinder head 10*b*, as shown in FIG. 3, for the cooling system 20 of the engine system 100 to be applied in the aforementioned embodiment. It is formed so as to control the temperature of the intake port preferentially over other regions by flowing cooling water only in the circulation passage B between the heat accumulation container 21 and the cylinder head 10*b*, preferentially near the intake port especially in the cylinder head during the pre-heat.

Figure 18:
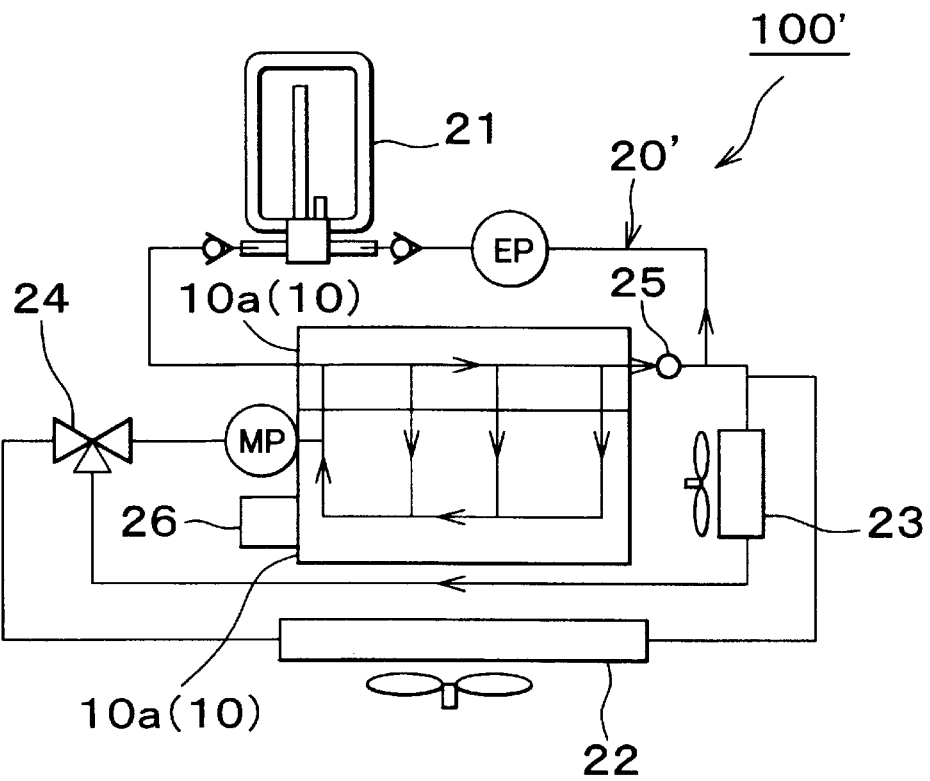
FIG. 18 is a schematic diagram showing the outline of an engine system according to another embodiment.

On the contrary, effects similar to the aforementioned embodiment can also be expected, for example, by an engine system 100' shown in FIG. 18, whose cooling system 20' is provided with a common cooling water circulation passage in the cylinder block 10*a* and the cylinder head 10*b* for circulating cooling water through the entire engine 10 during the pre-heat.

Figure 19:
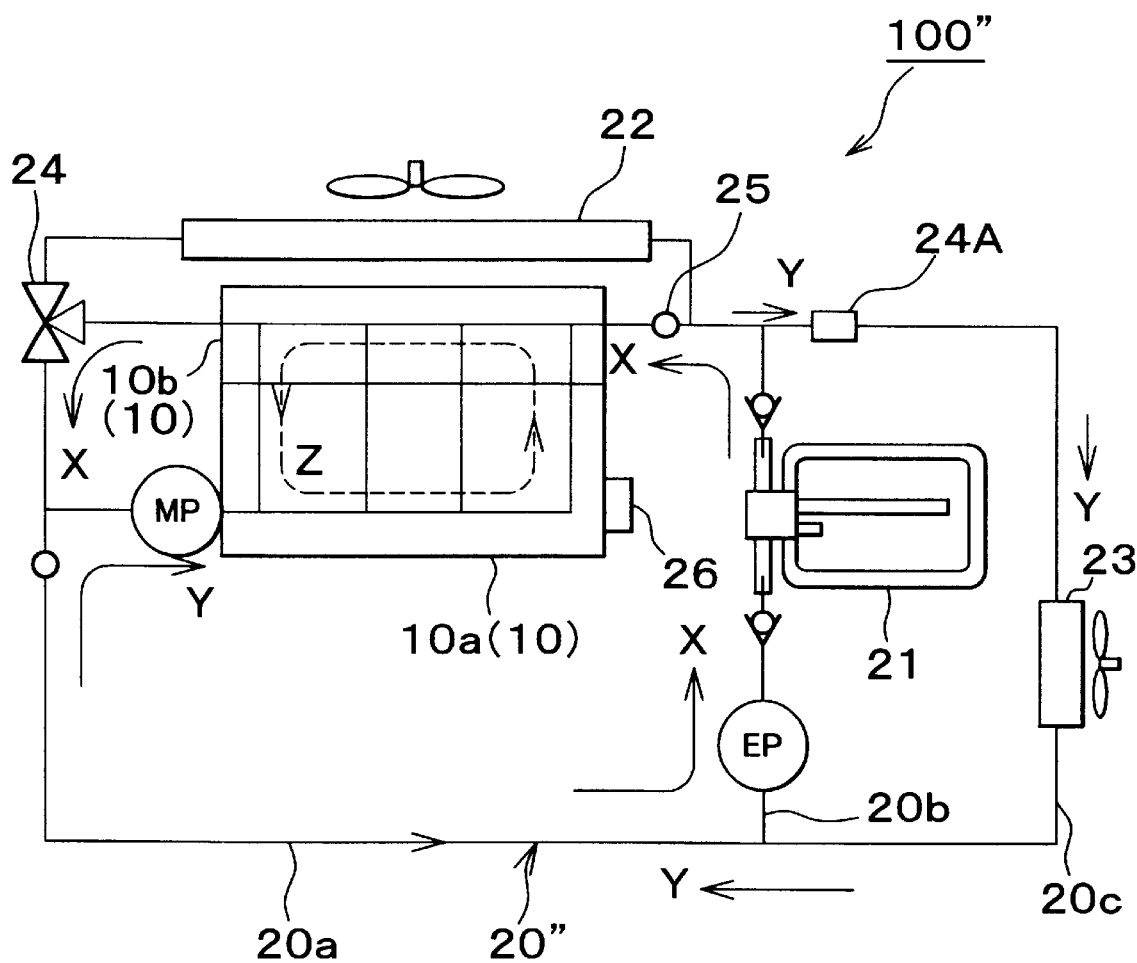
FIG. 19 is a schematic diagram showing the outline of an engine system according to another embodiment.

Also, the invention can be applied to an engine system 100" shown in FIG. 19.

In the engine system 100", a passage 20*b* and a passage 20*c* are juxtaposed in the middle of the circulation passage 20*a* for circulating cooling water through the engine 10 as a part of its cooling system 20", and the heat accumulation container 21 and a heater core for heating 23 are disposed in the middle of respective passages. The flow rate of cooling water flowing in the passage 20*c* is formed so as to be controllable by a flow control valve 24A. In the engine system 100" of such a configuration, the cooling water in the cooling system 20" flows in the opposite direction during the pre-heat and normal engine running.

In other words, the cooling water flows in the direction of arrow X in the respective zones by the operation of the electric pump EP during the pre-heat, while the cooling water flows in the direction of arrow Y in the respective zones by operating the mechanical pump MP in a manner so as to draw in the cooling water into the engine 10 during normal engine running. If the mechanical pump drives with the flow control valve in a full open state, the cooling water circulates in a state substantially enclosed in the engine 10 (arrow direction Z), and in such an embodiment, the cooling water temperature in the engine 10 can be warmed rapidly immediately after the starting of the engine 10, or the like. If such configuration of cooling system 20" is used with the "pre-heat control" according to the aforementioned embodiment, the warm up efficiency prior to and after the engine starting can further be improved.

Alternatively, the engine 10 may be formed so as to circulate the cooling water in each of the portions, for example, the region around the intake port 16 of the cylinder head 10*b*, the region around the exhaust port 17 of the cylinder head 10*b*, and the cylinder block 10*a*. A preferential order may be set for elevating the temperature for improving the discharge characteristics and fuel consumption at the initial stage of the starting of the engine 10, and control may be carried out so as to supply hot water sequentially beginning from the portion highest in the preferential order. To be more specific, it is preferable that, first, a part of the total amount of hot water stored in the heat accumulation container 21 is supplied to the region around the intake port 16, then, another part of the total amount of hot water stored in the heat accumulation container 21 is supplied to the region around the intake port 17 after a predetermined period of time, and thereafter, the remaining hot water stored in the heat accumulation container 21 is supplied to the cylinder block 10*a*. Also, a control logic may be constructed concerning the structure of the cooling system or the pre-heat execution so as to sequentially expand the range of hot water supply (circulation) from a highly local range high in the preferential order to a larger range including portions lower in the preferential order, such as from hot water supply (circulation) to the region around the intake port 16→hot water supply (circulation) to the region including the periphery of the intake port 16 and the periphery of the exhaust port 17→hot water supply (circulation) to the whole engine 10.

Further, in the aforementioned embodiment, the heat accumulator of the invention comprises the cooling system 20, 20' or 20" formed integrally with the engine 10 and the ECU 30. On the contrary, any apparatus that can accumulate heat by any method and supply an internal combustion engine with heat prior to start of the engine can fulfill the function of the heat accumulator of the invention. In other words, an apparatus accumulating heat through oil or another heat medium, provided that it accumulates heat and functions as a heat source, or an apparatus for accumulating heat as electricity, or an apparatus for accumulating chemical materials containing heat latently and generating heat conveniently by its chemical reaction can also be applied as a heat accumulator. Still further, the engine system, or other systems (apparatuses) corresponding to the same may be formed to supply heat by heat radiation or heat conduction from the heat accumulator without going through a heat medium such as cooling water.

In addition, the object for application of the internal combustion engine provided with such a heat accumulator for performing the pre-heat is not limited to a vehicle.

The internal combustion engine may be a so-called hybrid engine, provided with another driving means (for example, electric motor) for generating driving force by the internal combustion engine in cooperation with another driving means (motor). In this case, for example, it may so controlled to perform the driving operation only by another driving means until completion of heat supply (pre-heat) from the heat accumulator.

Further, effects equivalent or similar to the aforementioned embodiment can be expected, with respect to performing control for optimizing the operating conditions, especially operating conditions during the operation start of the heat receiving object, when the invention is applied to any heat supply system having a function to supply heat to any heat receiving object including an engine, mechanism, equipment, driving circuit or other requiring some warm up, in other words, heat supply to secure good operating conditions, such as another simple driving means (for example, an electric motor), a battery of fuel cell for supplying the electric motor with power, fuel injection valve, transmission, or the like.

There, effects equivalent or similar to the aforementioned embodiment can be expected, when the invention is applied to any heat receiving object, for controlling the operating conditions of heat receiving objects of such an internal combustion engine, electric motor, fuel injection valve, transmission, or the like, by controlling (for example, prohibiting or allowing) the stop timing or degree of driving conditions (for example, the output state) and various operating conditions such as a change gear ratio of the transmission, or others, without being limiting to the starting timing of the respective heat receiving objects.

In the aforementioned embodiment, the invention is applied to an automobile (vehicle 1) with a so-called automatic transmission system, not requiring clutch operation to drive the same. However, the invention may be applied to a vehicle adopting a so-called manual transmission system.

In this case, the prerequisite of the "state wherein the position of the shift lever 8 (shift position) is in the position for parking (park position)" is excluded from the judgment in steps S101, S401, and S501 in the "pre-heat control routine" of FIG. 10, FIG. 14, and FIG. 15.

Figure 20:
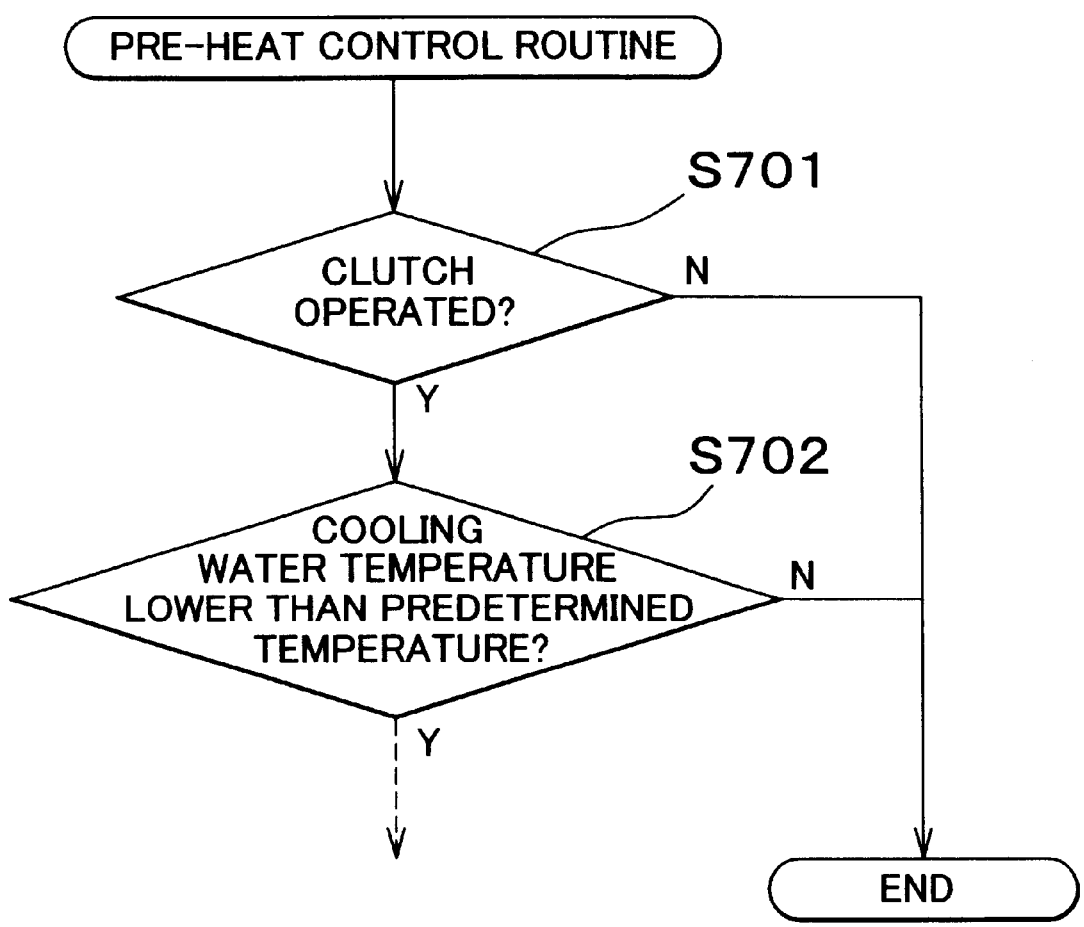
FIG. 20 is a flow chart showing a part of pre-heat control according to another embodiment.

Moreover, as shown in FIG. 20, in step S701, the ECU 30 judges whether or not the clutch of the vehicle is depressed, and shifts the process to step 702 if the judgment is positive and terminates the "pre-heat control routine" if this judgment is negative. Here, the recognition of the depressing operation of the clutch is made based on an output signal from a clutch sensor (not shown) mounted on the clutch pedal.

Various sensor equipment or the display device 9 or other disposed in the vehicle according to the aforementioned embodiment may be provided in correspondence to respective embodiments of the aforementioned "pre-heat control", and all sensor equipment or other mentioned above are not essential elements for an embodiment. That is, it is sufficient to just have the necessary members (sensor equipment or the like) disposed individually and selectively on the vehicle, internal combustion engine or control apparatus, which is the object of application.

As mentioned above, according to the first aspect, it becomes possible to set a start timing of heat supply retroacting by a convenient period from the starting timing of the heat receiving object, even when the engine is started at an arbitrary timing, by starting to supply heat taking as reference a specific event occurring by necessity prior to the starting of the engine.

In addition, an operation high in both of the necessity of being prior to the starting of the internal combustion engine and the reproducibility of the operation timing is selected and the start timing of the heat supply is determined based on this selected operation timing. Consequently, it is possible to securely set an appropriate start timing each time when the engine is started.

Moreover, the sustention period of the heat supply by the heat supply device is contained within the working release operation period of the antitheft device such that the driver of the vehicle will not feel a sense of discomfort during the sustention of the heat supply. Consequently, it becomes possible to ensure the comfort of driving operations for the driver sufficiently with respect to the starting of the internal combustion engine.

The convenience with respect to the operation of the heat accumulator will also be improved as the driver himself/herself of the vehicle in which the internal combustion engine is installed can easily perform heat supply prior to the starting of the internal combustion engine.

According to the second embodiment of the invention, a finite amount of heat stored in the heat accumulator can be used for a period of time longer than in the case where the quantity of heat stored in the heat accumulator is discharged (consumed) continuously. That is, the temperature of the engine, once elevated, is substantially prevented from dropping again, even under conditions in which the starting timing is unstable, for example, when the starting timing of the engine is delayed for some reason.

Consequently, the heat supply is reliably completed upon starting of the engine, even when the engine is to be started at an arbitrary timing.

Emission characteristics and fuel consumption with regard to the starting of the engine can further be improved, as the heat supply is sustained even in the initial stage of the starting of the engine.

Moreover, even when the amount of heat stored in the heat accumulator is limited, it can be used for a period of time longer than in the case where the quantity of heat stored in the heat accumulator is discharged (consumed) continuously.

Therefore, heat supply is reliably completed at the starting of the engine, even when the heat receiving object is to be started at an arbitrary timing.

Consequently, regarding heat supply for the starting of the heat receiving object, the desirable heat supply period or heat supply amount required for ensuring the optimal operation state are reliably applied.

In addition, the operation state for the starting of the heat receiving object can be ensured more conveniently, as the heat supply is sustained even in the initial stage of the starting of the heat receiving object.

What is claimed is:

1. An internal combustion engine for a vehicle, comprising:
    a circulation passage that circulates a heat medium;
    an heat accumulator that accumulates heat;
    a heat supply device that supplies the circulation passage with heat accumulated by the heat accumulator through the heat medium;
    a controller that starts to supply the circulation passage with heat by the heat supply device, at a timing set based on specific timing elements related to starting of the engine, and prior to the starting of the engine; and
    an antitheft device that works while operation of the internal combustion engine is stopped, prevents theft of the vehicle, wherein the heat supply timing by the heat supply device is set taking the timing at which the working release of the antitheft device is started as the timing element.

2. The internal combustion engine according to claim 1, wherein
    the working release operation of the antitheft device is sustained at least until the end of heat supply to the circulation passage by the heat supply device.

3. An internal combustion engine for a vehicle, comprising:
    a circulation passage that circulates a heat medium;
    an heat accumulator that accumulates heat;
    a heat supply device that supplies the circulation passage with heat accumulated by the heat accumulator through the heat medium; and
    a controller that starts to supply the circulation passage with heat by the heat supply device, at a timing set based on specific timing elements related to starting of the engine, and prior to the starting of the engine, wherein the heat supply timing by the heat supply device is set taking the timing at which a door opening/closing sensor that detects an open/close state of a door for getting in and out of the vehicle is opened as the timing element.

4. The internal combustion engine for a vehicle, comprising:
    a circulation passage that circulation passage that circulates a heat medium;
    an heat accumulator that accumulates heat;
    a heat supply device that supplies the circulation passage with heat accumulated by the heat accumulator through the heat medium;
    a controller that starts to supply the circulation passage with heat by the heat supply device, at a timing set based on specific timing elements related to starting of the engine, and prior to the starting of the engine; and a seating detection sensor that detects a person seated in a driver's seat of the vehicle, wherein the heat supply timing by the heat supply device is set taking the timing at which the seating the person is detected a the timing element.

5. An internal combustion engine for a vehicle, comprising:

a circulation passage that circulates a heat medium;

an heat accumulator that accumulates heat;

a heat supply device that supplies the circulation passage with heat accumulated by the heat accumulator through the heat medium;

a controller that starts to supply the circulation passage with heat by the supply device, at a timing set based on specific timing elements related to starting of the engine, and prior to the starting of the engine; and a seat belt fastening detection sensor that detects fastening of a seat belt provided on the driver's seat of the vehicle, wherein the heat supply timing by the heat supply device is set taking the timing at which fastening of the seat belt is detected as the timing element.

6. An internal combustion engine for a vehicle, comprising:

a circulation passage that circulates a heat medium;

an heat accumulator that accumulates heat;

a heat supply device that supplies the circulation passage with heat accumulated by the heat accumulator through the heat medium;

a controller that starts to supply the circulation passage with heat by the heat supply device, at a timing set based on specific timing elements related to starting of the engine, and prior to the starting of the engine, and a brake operation detection sensor that detects a brake operation of the vehicle, wherein the heat supply timing by the heat supply device is set taking the timing at which the brake operation is detected as the timing element.

7. An internal combustion engine for a vehicle, comprising:

a circulation passage that circulates a heat medium;

an heat accumulator that accumulates heat;

a heat supply device that supplies the circulation passage with heat accumulated by the heat accumulator through the heat medium;

a controller that starts to supply the circulation passage with heat by the heat supply device, at a timing set based on specific timing elements related to starting of the engine, and prior to the starting of the engine; and a clutch operation detection sensor that detects a clutch operation of the vehicle, wherein the heat supply timing by the heat supply device is set taking the timing at which the clutch operation is detected as the timing element.

8. An internal combustion engine for a vehicle, comprising:

a circulation passage that circulates a heat medium;

an heat accumulator that accumulates heat;

a heat supply device that supplies the circulation passage with heat accumulated by the heat accumulator through the heat medium;

a controller that starts to supply the circulation passage with heat by the heat supply device, at a timing set based on specific timing elements related to starting of the engine, and prior to the starting of the engine;

a lock that locks a door for getting in and out of the vehicle; and a lock release detection sensor that detects release of the lock and an open/close state of a door, wherein the heat supply timing by the heat supply device is set taking the timing at which release of the lock is detected as the timing element.

9. An internal combustion engine for a vehicle, comprising:

a circulation passage that circulates a heat medium;

an heat accumulator that accumulates heat;

a heat supply device that supplies the circulation passage with heat accumulated by the heat accumulator through the heat medium;

a controller that starts to supply the circulation passage with heat by the heat supply device, at a timing set based on specific timing elements related to starting of the engine, and prior to the starting of the engine; and an external input device that makes the controller recognize the timing element through an input operation from outside.

10. The internal combustion engine according to claim 9, wherein the external input device makes the input operation be executed remote from the vehicle.

11. The internal combustion engine according to claim 9, wherein the external input device makes the input operation be executed through voice.

12. The internal combustion engine according to claim 9, wherein the external input device comprises a display for displaying an operation panel, and makes the input operation be executed through a touch operation to the operation panel.

13. An internal combustion engine for a vehicle, comprising:

a circulation passage that circulates a heat medium;

an heat accumulator that accumulates heat;

a heat supply device that supplies the circulation passage with heat accumulated by the heat accumulator through the heat medium; and a controller that starts to supply the circulation passage with heat by the heat supply device, at a timing set based on specific timing elements related to starting of the engine, and prior to the starting of the engine, wherein the controller supplies the engine with heat by the heat supply device a plurality of times after the start of the heat supply until the starting of the engine.

14. The internal combustion engine according to claim 13, wherein the controller makes at least one of the plurality of times of heat supply by the heat supply device be executed at the time of starting the engine.

15. A control apparatus of a heat receiving object, comprising:

a heat supply device that supplies a heat receiving object with heat when a predetermined condition is established; and a controller that decides the establishment of the predetermined condition based on a specific state related to the starting of the heat receiving object and, at the same time, controls the supply timing of heat to the heat receiving object based on the specific state related to the starting operation of the heat receiving object, wherein the controller makes heat supply a plurality of times by the heat supply device to the heat receiving object be executed from after the start of supply of heat to the heat receiving object until the heat receiving object starts to operate.

16. The control apparatus according to claim 15, wherein at least one of the plurality of times of heat supply by the heat supply device is executed at the time of starting operation of the heat receiving object.

17. The control apparatus according to claim 15, further comprising:
an antitheft device that prevents theft of a vehicle, wherein the specific state is a working state of the antitheft device.

18. An internal combustion engine comprising:
a circulation passage that circulates a heat medium;
a heat accumulator that accumulates heat;
a heat supply device that supplies the circulation passage with heat accumulated by the heat accumulator through the heat medium; and
a controller that supplies the engine with heat a plurality of times by the heat supply device until the engine starts.

19. The internal combustion engine according to claim 18, wherein
the controller makes at least one of the plurality of times of heat supply by the heat supply device be executed at the time of starting the engine.

20. A control apparatus of a heat supply system, comprising:
a heat receiving object:
a heat supply system that supplies the heat receiving object with heat: and
a controller that supplies the heat receiving object with heat by the heat supply system a plurality of times from after the start of supply of heat to the heat receiving object until the heat receiving object starts to operate.

21. The control according to claim 20, wherein
at least one of the plurality of times of heat supply by the heat supply system is executed at the time of starting operation of the heat receiving object.

22. The control apparatus according to claim 20, wherein the heat receiving object is a motor.

23. The control apparatus according to claim 22, wherein the motor comprises an internal combustion engine.

24. A control method of an internal combustion engine including a circulation passage that circulates a heat medium, a heat accumulator that accumulates heat, and a heat supply device that supplies the circulation passage with heat accumulated by the heat accumulator through the heat medium, comprising steps of:
recognizing a specific timing element prior to the starting of the engine, concerning the starting of the engine; and
starting to supply the circulation passage with heat by the heat supply device prior to the starting of the engine, when the timing element is recognized, wherein the engine is supplied with heat a plurality of times by the heat supply device from after the start of the heat supply until the engine starts.

* * * * *